(12) United States Patent
Tanaka et al.

(10) Patent No.: US 9,007,479 B2
(45) Date of Patent: Apr. 14, 2015

(54) IMAGING APPARATUS AND EVALUATION VALUE GENERATION APPARATUS

(71) Applicant: Olympus Corporation, Tokyo (JP)

(72) Inventors: Yoshinobu Tanaka, Tokyo (JP); Takashi Yanada, Tokyo (JP); Tomoyuki Sengoku, Tokyo (JP)

(73) Assignee: Olympus Corporation, Tokyo (JP)

( * ) Notice: Subject to any disclaimer, the term of this patent is extended or adjusted under 35 U.S.C. 154(b) by 201 days.

(21) Appl. No.: 13/724,252

(22) Filed: Dec. 21, 2012

(65) Prior Publication Data
US 2013/0162863 A1 Jun. 27, 2013

(30) Foreign Application Priority Data
Dec. 27, 2011 (JP) .................................. 2011-286029

(51) Int. Cl.
*H04N 5/235* (2006.01)
*H04N 9/73* (2006.01)

(52) U.S. Cl.
CPC ..................................... *H04N 9/735* (2013.01)

(58) Field of Classification Search
USPC .............................. 348/221.1, 223.1, 345, 362
See application file for complete search history.

(56) References Cited

U.S. PATENT DOCUMENTS 7,479,990 B2 * 1/2009 Imaizumi et al. .......... 348/223.1
2003/0174216 A1 * 9/2003 Iguchi et al. ............... 348/223.1

FOREIGN PATENT DOCUMENTS

JP 2008-005048 A 1/2008

\* cited by examiner

*Primary Examiner* — Anthony J Daniels
(74) *Attorney, Agent, or Firm* — Westerman, Hattori, Daniels & Adrian, LLP

(57) ABSTRACT

An imaging apparatus and an evaluation value generation apparatus can include an image data interface unit that outputs image data according to a pixel signal input from a solid-state imaging device as first image data, an image data reading unit that reads image data stored in a storage unit and outputs the read image data as second image data, an evaluation value generation unit that generates an evaluation value based on input image data, an image data selection unit that selects one of image data based on the first image data and image data based on the second image data as image data to be input to the evaluation value generation unit, and an image data writing unit that stores the image data based on the first image data in the storage unit.

16 Claims, 9 Drawing Sheets

ALTERNATELY ACQUIRE SHORT EXPOSURE AND LONG EXPOSURE

IMAGING APPARATUS AND EVALUATION VALUE GENERATION APPARATUS

BACKGROUND OF THE INVENTION

1. Field of the Invention

The present invention relates to an imaging apparatus and an evaluation value generation apparatus.

Priority is claimed on Japanese Patent Application No. 2011-286029, filed Dec. 27, 2011, the content of which is incorporated herein by reference.

2. Description of Related Art

As controls of photography in recent imaging apparatus such as digital cameras, there are controls such as auto exposure (AE), auto white balance (AWB), and auto focus (AF).

In control of AE, AWB and AF in a conventional imaging apparatus, evaluation values (an AE evaluation value, an AWB evaluation value, and an AF evaluation value) for the respective controls are generated based on a pixel signal output from a solid-state imaging device (hereinafter referred to as an "image sensor"). In this case, in the conventional imaging apparatus, evaluation value generation units (an AE evaluation value generation unit, an AWB evaluation value generation unit, and an AF evaluation value generation unit), which generate the respective evaluation values while acquiring the pixel signal output from the image sensor, generate the respective evaluation values in real time (see Japanese Unexamined Patent Application, First Publication No. 2008-5048).

FIG. 10 is a block diagram illustrating a schematic configuration of a conventional imaging apparatus. In FIG. 10, the imaging apparatus includes an image sensor, an imaging processing unit, an image processing unit, a DRAM (Dynamic Random Access Memory) controller, a DRAM, a display processing unit, a display device, and a CPU. Further, in FIG. 10, a schematic internal configuration of the imaging processing unit is also shown. In FIG. 10, the imaging processing unit includes an imaging IF (interface) unit, a preprocessing unit, an AE evaluation value generation unit, an AWB evaluation value generation unit, an AF evaluation value generation unit, and an output DMA (Direct Memory Access) unit.

In the conventional imaging apparatus illustrated in FIG. 10, the imaging IF unit acquires a pixel signal from the image sensor, and outputs the acquired pixel signal as image data to the preprocessing unit. The preprocessing unit performs various processing on the image data input from the imaging IF unit. In FIG. 10, an example of the preprocessing unit including three processing units that perform the respective processing is illustrated. The preprocessing unit outputs final image data obtained by the respective processing units sequentially performing the processing to the AE evaluation value generation unit, the AWB evaluation value generation unit, the AF evaluation value generation unit, and the output DMA unit.

The AE evaluation value generation unit, the AWB evaluation value generation unit, and the AF evaluation value generation unit generate the evaluation values based on the image data input from the preprocessing unit. The AE evaluation value generation unit, the AWB evaluation value generation unit, and the AF evaluation value generation unit store the generated AE evaluation value, the generated AWB evaluation value, and the generated AF evaluation value in the DRAM via the DRAM controller, respectively. Using the respective evaluation values stored in the DRAM, the CPU performs the control of AE, AWB and AF in the conventional imaging apparatus.

The AE evaluation value generation unit, the AWB evaluation value generation unit, and the AE evaluation value generation unit may hold the generated AE evaluation value, the generated AWB evaluation value, and the generated AF evaluation value in registers in the evaluation value generation units, respectively, instead of storing the generated evaluation values in the DRAM. In the case of such a configuration, the CPU receives a notification indicating that generation of the evaluation values has been completed from the respective evaluation value generation units and then reads the respective evaluation values held in the registers of the respective evaluation value generation units. Using the respective read evaluation values, the CPU performs control of AE, AWB and AF in the imaging apparatus.

Further, the output DMA unit stores the image data input from the preprocessing unit in the DRAM via the DRAM controller. Here, the image data stored in the DRAM becomes original image data that is image-processed by the image processing unit later.

With this configuration, the conventional imaging apparatus generates the AE evaluation value, the AWB evaluation value, and the AF evaluation value while acquiring the pixel signal output from the image sensor in real time. Thus, in the conventional imaging apparatus, the AE evaluation value, the AWB evaluation value, and the AF evaluation value for control of AE, AWB, and AF can be immediately generated.

SUMMARY OF THE INVENTION

An imaging apparatus according to a first aspect of the present invention includes an image data interface unit that outputs image data according to a pixel signal input from a solid-state imaging device as first image data; an image data reading unit that reads image data stored in a storage unit and outputs the read image data as second image data; an evaluation value generation unit that generates an evaluation value based on input image data; an image data selection unit that selects one of image data based on the first image data and image data based on the second image data as image data to be input to the evaluation value generation unit; and an image data writing unit that stores the image data based on the first image data in the storage unit.

Further, according to a second aspect of the present invention, the imaging apparatus according to the first aspect of the present invention further include: a first preprocessing unit that performs a predetermined process on an input image data; and a second preprocessing unit that performs a predetermined process on an input image data. The first preprocessing unit outputs, as third image data, image data obtained by performing a predetermined process on one of the first image data and the second image data to be input. The second preprocessing unit outputs, as fourth image data, image data obtained by performing a predetermined process on the other of the first image data and the second image data to be input. The image data selection unit selects one of the third image data and the fourth image data as the image data to be input to the evaluation value generation unit. The image data writing unit stores one of the third image data and the fourth image data based on the first image data in the storage unit.

Further, according to a third aspect of the present invention, the first preprocessing unit according to the second aspect of the present invention is at least one processing unit that performs a predetermined correction process on input image data. The second preprocessing unit is at least one delay unit that performs a process of delaying input image data by a predetermined time and outputting delayed image data.

Further, according to a fourth aspect of the present invention, the predetermined time in the imaging apparatus according to the third aspect of the present invention is the same time as a delay time from a time when the image data is input to the first preprocessing unit to a time when the image data is subjected to the predetermined correction process and output.

Further, according to a fifth aspect of the present invention, the first preprocessing unit according to the second aspect of the present invention is at least one first processing unit that performs a predetermined correction process on the input image data. The second preprocessing unit is at least one second processing unit that performs a predetermined correction process on the input image data.

Further, according to a sixth aspect of the present invention, in the imaging apparatus according to the fourth or fifth aspect of the present invention, when the evaluation value generation unit generates an evaluation value based on the image data according to the pixel signal input from the solid-state imaging device, the image data selection unit selects one of the third image data and the fourth image data based on the first image data as the image data to be input to the evaluation value generation unit, and when the evaluation value generation unit generates an evaluation value based on the image data stored in the storage unit, the image data selection unit selects one of the third image data and the fourth image data based on the second image data as the image data to be input to the evaluation value generation unit Further, according to a seventh aspect of the present invention, the imaging apparatus according to the sixth aspect of the present invention further includes: an image processing unit that performs predetermined image processing on the image data stored in the storage unit and stores image data after the image processing in the storage unit again. When the evaluation value generation unit generates an evaluation value based on the image data after the image processing in the image processing unit, the image data reading unit reads the image data after the image processing in the image processing unit, which is stored in the storage unit, and outputs the read image data as the second image data. The image data selection unit selects one of the third image data and the fourth image data based on the second image data as the image data to be input to the evaluation value generation unit.

Further, according to an eighth aspect of the present invention, the imaging apparatus according to the sixth aspect of the present invention further includes: a motion detection unit that detects a motion of a subject contained in the image data based on the image data stored in the storage unit. When the evaluation value generation unit generates an evaluation value according to the motion of the subject detected by the motion detection unit, the image data reading unit reads the image data used when the motion detection unit detects the motion of the subject, which is stored in the storage unit, and outputs the read image data as the second image data. The image data selection unit selects one of the third image data and the fourth image data based on the second image data as the image data to be input to the evaluation value generation unit.

Further, according to a ninth aspect of the present invention, in the imaging apparatus according to the sixth aspect of the present invention, the solid-state imaging device divides an pixel signal of one image into a plurality of fields and outputs a resultant pixel signal. When the evaluation value generation unit generates an evaluation value based on image data according to the pixel signal of one image input from the solid-state imaging device, the image data interface unit outputs image data of respective fields according to respective pixel signals divided into the plurality of fields, which are input from the solid-state imaging device, as the first image data of the respective fields. The image data writing unit sequentially stores, in the storage unit, one of the third image data and the fourth image data based on the first image data of the respective fields. The image data reading unit reads the first image data of all the fields constituting one image and outputs the first image data as the second image data corresponding to the one image so that the first image data of the respective fields stored in the storage unit are combined as the one image. The image data selection unit selects one of the third image data and the fourth image data based on the second image data corresponding to the one image as the image data to be input to the evaluation value generating unit.

Further, according to a tenth aspect of the present invention, the imaging apparatus according to the sixth aspect of the present invention further includes: an image processing unit that performs predetermined image processing on the image data stored in the storage unit and stores image data after the image processing in the storage unit again. When the evaluation value generation unit generates an evaluation value based on the image data after the image processing unit performs the image processing on each image data according to each pixel signal obtained while changing an exposure condition of the solid-state imaging device, the image data interface unit outputs image data of respective exposure conditions according to the pixel signal of the respective exposure conditions input from the solid-state imaging device as the first image data of the respective exposure conditions. The image data writing unit sequentially stores, in the storage unit, one of the third image data and the fourth image data based on the first image data of the respective exposure conditions. The image data reading unit reads one image data after the image processing unit performs image processing to synthesize the first image data of the respective exposure conditions, being stored in the storage unit, into one image, and outputs the read image data as the second image data. The image data selection unit selects one of the third image data and the fourth image data based on the one second image data as the image data to be input to the evaluation value generating unit.

Further, according to an eleventh aspect of the present invention, in the imaging apparatus according to any one of the seventh to tenth aspects of the present invention, the imaging apparatus includes a plurality of evaluation value generation units; and a plurality of image data selection units corresponding to the plurality of evaluation value generation units, respectively. Each image data selection unit selects one of the third image data and the fourth image data based on one of the first image data and the second image data to be used when the corresponding evaluation value generation unit generates the evaluation value as image data to be input to the corresponding evaluation value generation unit.

Further, according to a twelfth aspect of the present invention, in the imaging apparatus according to the eleventh aspect of the present invention, at least one of the image data selection units selects one of the third image data and the fourth image data based on one of the first image data and the second image data to be used when the corresponding evaluation value generation unit generates the evaluation value as the image data to be input to the corresponding evaluation value generation unit. At least another of the image data selection units selects the other of the third image data and the fourth image data based on the other of the first image data and the second image data to be used when the corresponding evaluation value generation unit generates the evaluation value as the image data to be input to the corresponding evaluation value generation unit.

Further, an evaluation value generation apparatus according to a thirteenth aspect of the present invention includes: an image data interface unit that outputs image data according to a pixel signal input from a solid-state imaging device as first image data; an image data reading unit that reads image data stored in a storage unit and outputs the read image data as second image data; an evaluation value generation unit that generates an evaluation value based on input image data; an image data selection unit that selects one of image data based on the first image data and image data based on the second image data as image data to be input to the evaluation value generation unit; and an image data writing unit that stores the image data based on the first image data in the storage unit.

DETAILED DESCRIPTION OF THE INVENTION

Hereinafter, embodiments of the present invention will be described with reference to the accompanying drawings.

Figure 1:
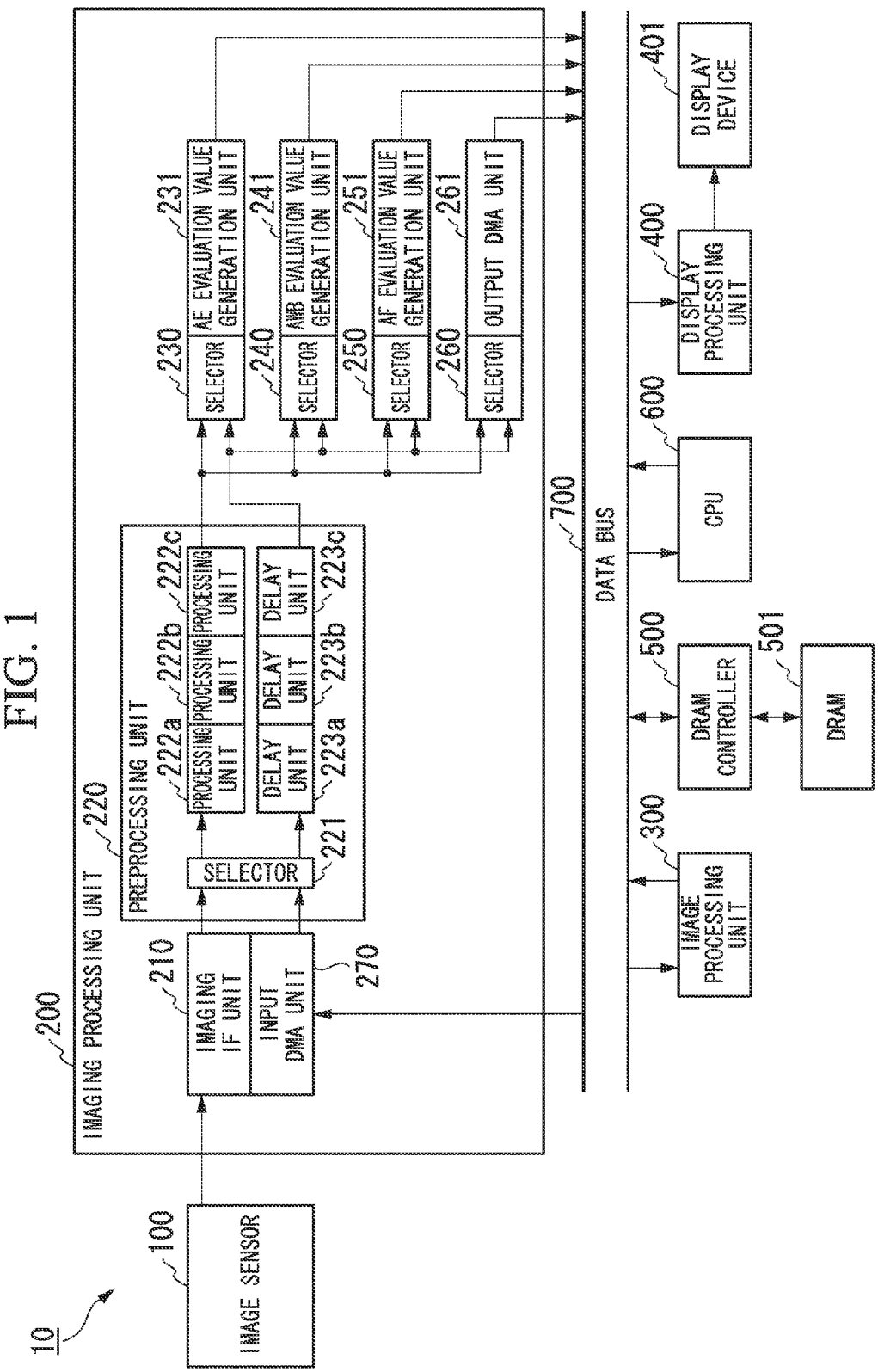
FIG. 1 is a block diagram illustrating a schematic configuration of an imaging apparatus in an embodiment of the present invention.

FIG. 1 is a block diagram illustrating a schematic configuration of an imaging apparatus in the present embodiment. An imaging apparatus 10 illustrated in FIG. 1 includes an image sensor 100, an imaging processing unit 200, an image processing unit 300, a display processing unit 400, a display device 401, a DRAM (Dynamic Random Access Memory) controller 500, a DRAM 501, and a CPU 600.

The imaging processing unit 200, the image processing unit 300, the display processing unit 400, the DRAM controller 500, and the CPU 600 in the imaging apparatus 10 are connected via a data bus 700 and, for example, reading of data from the DRAM 501 connected to the DRAM controller 500 and writing of data to the DRAM 501 are performed by DMA (Direct Memory Access).

Figure 10:
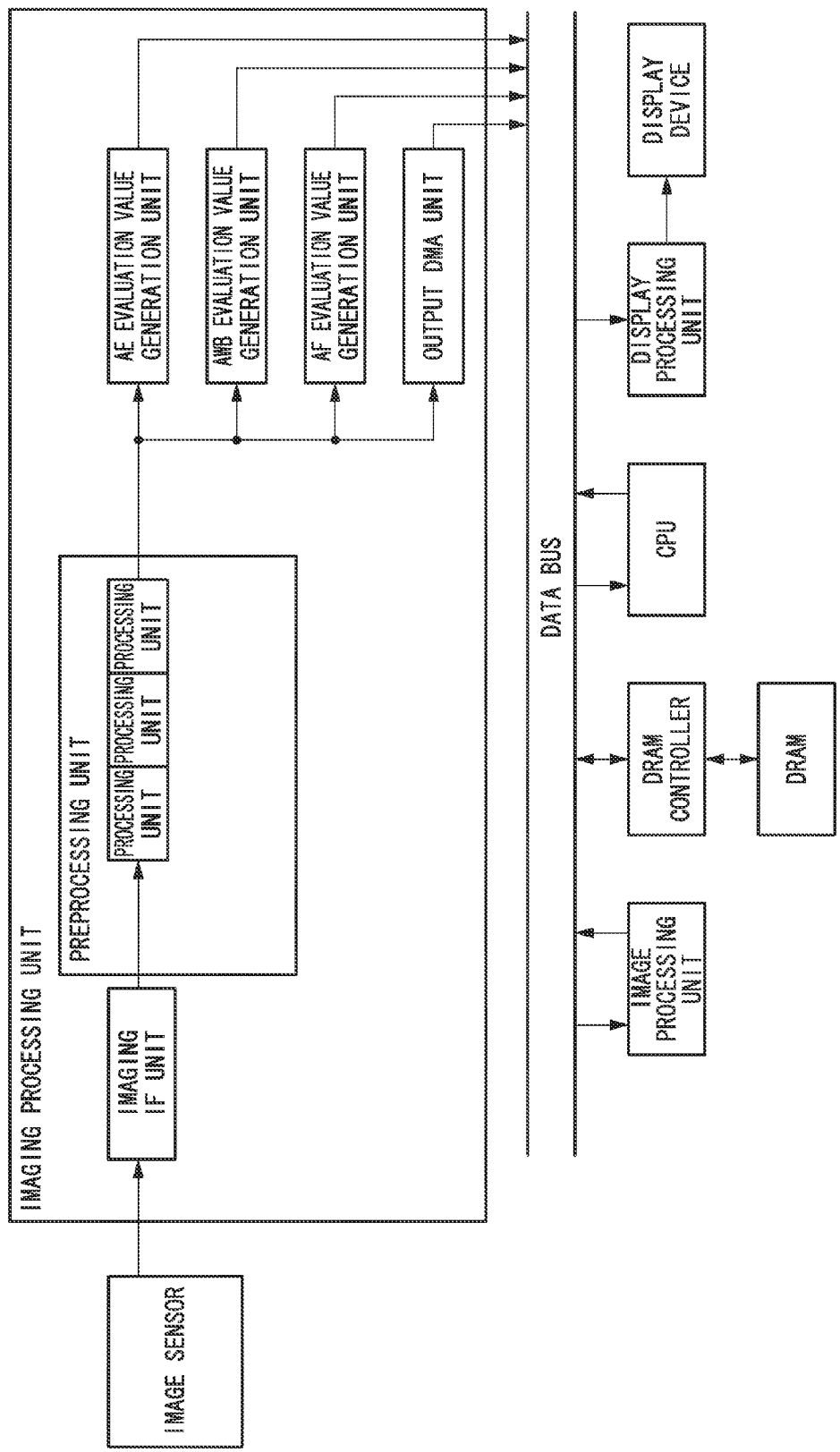
FIG. 10 is a block diagram illustrating a schematic configuration of a conventional imaging apparatus.

The imaging apparatus 10 illustrated in FIG. 1 includes the same components as the conventional imaging apparatus illustrated in FIG. 10. However, a configuration of the imaging processing unit 200 in the imaging apparatus 10 differs from that of the imaging processing unit included in the conventional imaging apparatus. In FIG. 1, a schematic configuration of the imaging processing unit 200 is also shown, focusing on the imaging processing unit 200 having a different configuration from the conventional imaging apparatus.

The imaging processing unit 200 in the imaging apparatus 10 includes an imaging IF (interface) unit 210, a preprocessing unit 220, a selector 230, an AE evaluation value generation unit 231, a selector 240, an AWB evaluation value generation unit 241, a selector 250, an AF evaluation value generation unit 251, a selector 260, an output DMA (Direct Memory Access) unit 261, and an input DMA unit 270.

The image sensor 100 includes, as a representative image sensor, a CCD (Charge Coupled Device) image sensor or a CMOS (Complementary Metal-Oxide Semiconductor) image sensor that performs photoelectric conversion on an optical image of a subject formed by a zoom lens, which is not shown.

In the image sensor 100, for example, color filters in a Bayer array are attached to an imaging surface. The image sensor 100 outputs a pixel signal of each color (e.g., R, Gr, Gb, and B) according to the subject light to the imaging processing unit 200. Since the configuration and the operation of the image sensor 100 are the same as, for example, those of the image sensor included in the conventional imaging apparatus illustrated in FIG. 10, a detailed description thereof will be omitted here.

The imaging processing unit 200 performs various processes on the pixel signal input from the image sensor 100 to generate an evaluation value for control of photography in the imaging apparatus 10 (control of AE, AWB, and AF). Further, the imaging processing unit 200 stores image data according to the pixel signal input from the image sensor 100 in the DRAM 501 via the DRAM controller 500.

Further, the imaging processing unit 200 acquires (reads) the image data stored in the DRAM 501, via the DRAM controller 500. Based on the acquired image data, the imaging processing unit 200 generates the evaluation value for control of photography (control of AE, AWB, and AF) in the imaging apparatus 10.

The imaging IF unit 210 acquires the pixel signal input from the image sensor 100, and outputs the acquired pixel signal as the image data to the preprocessing unit 220. When the imaging IF unit 210 outputs the image data to the preprocessing unit 220, the imaging IF unit 210 performs, for example, a sorting process to sort the data of the pixel signals of respective colors input from the image sensor 100 in order of colors of pixels used in a subsequent process. Further, when the image sensor 100 is an image sensor that outputs the pixel signal via a differential interface, the imaging IF unit 210 performs, for example, a process of termination for LVDS (Low Voltage Differential Signaling). Since the configuration or the operation of the imaging IF unit 210 is the same as, for example, that of the imaging IF unit included in the conventional imaging apparatus illustrated in FIG. 10, a detailed description thereof will be omitted here.

The preprocessing unit 220 performs various preprocessing such as defect correction or shading correction on the image data input from the imaging IF unit 210. The preprocessing unit 220 outputs image data as a processing result (hereinafter referred to as "preprocessed image data") to each of the selector 230, the selector 240, the selector 250, and the selector 260.

Further, the preprocessing unit 220 outputs image data obtained by delaying the image data input from the input DMA unit 270 by a predetermined time (hereinafter referred to as "delayed image data") to each of the selector 230, the selector 240, the selector 250, and the selector 260.

As illustrated in FIG. 1, the preprocessing unit 220 includes a selector 221, three processing units 222a to 222c, and three delay units 223a to 223c. In FIG. 1, an example of the preprocessing unit 220 including the three processing units 222a to 222c that sequentially perform respective processes, similar to the preprocessing unit included in the conventional imaging apparatus illustrated in FIG. 10, is illustrated.

The selector 221 selects an output destination of the image data input from the imaging IF unit 210 and the image data input from the input DMA unit 270. More specifically, the selector 221 outputs the image data input from the imaging IF unit 210 to any one of the processing unit 222a and the delay unit 223a. Further, the selector 221 outputs the image data input from the input DMA unit 270 to any one of the processing unit 222a and the delay unit 223a.

Each of the processing units 222a to 222c performs predetermined processing (a correction process) on the input image data. For example, the processing unit 222a performs a defect correction process on the input image data. Further, for example, the processing unit 222b performs a shading correction process on the image data after the defect correction process, which is input from the processing unit 222a.

Thus, the respective processing units 222a to 222c sequentially perform the predetermined processing (correction process) on the input image data. Also, the image data after the processing (correction process) in the processing unit 222c is output as preprocessed image data to each of the selector 230, the selector 240, the selector 250, and the selector 260. Since the configuration or the operation of each of the processing units 222a to 222c is the same as, for example, that of each of the three processing units included in the conventional imaging apparatus illustrated in FIG. 10, a detailed description thereof will be omitted here.

Each of the delay units 223a to 223c corresponds to one of the processing units 222a to 222c, delays the input image data by the same time as a delay time from an input of each of the processing units 222a to 222c to an output thereof, and outputs the delayed image data. For example, the delay unit 223a delays the input image data by the same time as a delay time (process time) due to the defect correction process of the processing unit 222a, and outputs the delayed image data. Further, for example, the delay unit 223b delays the image data delayed by the delay unit 223a by the same time as a delay time (process time) due to the shading correction process of the processing unit 222b, and outputs the delayed image data.

Thus, the respective delay units 223a to 223c sequentially delay the input image data by the same time as the delay time (process time) of the corresponding processing unit, and output the delayed image data. Also, the delayed image data after the delaying in the delay unit 223c is output as delayed image data to each of the selector 230, the selector 240, the selector 250, and the selector 260.

The selector 230 selects any one of the preprocessed image data and the delayed image data input from the preprocessing unit 220. The selector 230 outputs the selected image data to the AE evaluation value generation unit 231 as image data for generation of an AE evaluation value.

The AE evaluation value generation unit 231 calculates (generates) an AE evaluation value for control of exposure of the imaging apparatus 10 based on the image data input from the selector 230. When the image sensor 100 is an image sensor with the Bayer array, the AE evaluation value generation unit 231 generates each AE evaluation value by integrating the image data input from the selector 230 for each color (R, Gr, Gb, and B). Also, the AE evaluation value generation unit 231 stores the generated AE evaluation value in the DRAM 501 via the DRAM controller 500. Since the configuration or the operation of the AE evaluation value generation unit 231 is the same as, for example, that of the AE evaluation value generation unit included in the conventional imaging apparatus illustrated in FIG. 10, a detailed description thereof will be omitted here.

The AE evaluation value generation unit 231 may be configured to hold the generated AE evaluation value in a register in the AE evaluation value generation unit 231, instead of storing the generated AE evaluation value in the DRAM 501. In this case, after receiving a notification indicating that the generation of the AE evaluation value is completed from the AE evaluation value generation unit 231, the CPU 600 reads the AE evaluation value held in the register in the AE evaluation value generation unit 231. Using the read AE evaluation value, the CPU 600 performs control of AE in the imaging apparatus 10.

The selector 240 selects any one of the preprocessed image data and the delayed image data input from the preprocessing unit 220. The selector 240 outputs the selected image data to the AWB evaluation value generation unit 241 as image data for generation of the AWB evaluation value.

The AWB evaluation value generation unit 241 calculates (generates) the AWB evaluation value for control of white balance of the imaging apparatus 10 based on the image data input from the selector 240. When the image sensor 100 is an image sensor with the Bayer array, the AWB evaluation value generation unit 241 generates an AWB evaluation value for adjustment of a white level from image data of each color (R, Gr, Gb, and B) input from the selector 240. Also, the AWB evaluation value generation unit 241 stores the generated AWB evaluation value in the DRAM 501 via the DRAM controller 500. Since the configuration or the operation of the AWB evaluation value generation unit 241 is the same as, for example, that of the AWB evaluation value generation unit included in the conventional imaging apparatus illustrated in FIG. 10, a detailed description thereof will be omitted here.

The AWB evaluation value generation unit 241 may be configured to hold the generated AWB evaluation value in a register in the AWB evaluation value generation unit 241, instead of storing the generated AWB evaluation value in the DRAM 501. In this case, after receiving a notification indicating that the generation of the AWB evaluation value is completed from the AWB evaluation value generation unit 241, the CPU 600 reads the AWB evaluation value held in the register in the AWB evaluation value generation unit 241. The CPU 600 performs control of AWB in the imaging apparatus 10 using the read AWB evaluation value.

The selector 250 selects any one of the preprocessed image data and the delayed image data input from the preprocessing unit 220. The selector 250 outputs the selected image data to the AF evaluation value generation unit 251 as image data for generation of an AF evaluation value.

The AF evaluation value generation unit 251 calculates (generates) an AF evaluation value for control of focus of the imaging apparatus 10 based on the image data input from the selector 250. When the image sensor 100 is an image sensor with the Bayer array, the AF evaluation value generation unit 251 generates a luminance signal (Y signal) from image data of each color (R, Gr, Gb, and B) input from the selector 250. The AF evaluation value generation unit 251 generates an AF evaluation value based on the generated Y signal. Also, the AF evaluation value generation unit 251 stores the generated AF evaluation value in the DRAM 501 via the DRAM controller 500. Since the configuration or the operation of the AF evaluation value generation unit 251 is the same as, for example, that of the AF evaluation value generation unit included in the conventional imaging apparatus illustrated in FIG. 10, a detailed description thereof will be omitted here.

The AF evaluation value generation unit 251 may be configured to hold the generated AF evaluation value in a register in the AF evaluation value generation unit 251, instead of storing the generated AF evaluation value in the DRAM 501. In this case, after receiving a notification indicating that the generation of the AF evaluation value is completed from the AF evaluation value generation unit 251, the CPU 600 reads the AF evaluation value held in the register in the AF evaluation value generation unit 251. Using the read AF evaluation value, the CPU 600 performs control of AF in the imaging apparatus 10.

The selector 260 selects any one of the preprocessed image data and the delayed image data input from the preprocessing unit 220. The selector 260 outputs the selected image data to the output DMA unit 261 as original image data to be image-processed by the image processing unit 300.

The output DMA unit 261 stores the image data input from the selector 260 in the DRAM 501 via the DRAM controller 500 through DMA. When the image sensor 100 is an image sensor with the Bayer array, image data of the Bayer array is stored in the DRAM 501 as original image data (Bayer data) to be image-processed by the image processing unit 300. Since the configuration or the operation of the output DMA unit 261 is the same as, for example, that of the output DMA unit included in the conventional imaging apparatus illustrated in FIG. 10, a detailed description thereof will be omitted here.

The input DMA unit 270 acquires (reads) the image data stored in the DRAM 501, via the DRAM controller 500 through DMA. The input DMA unit 270 outputs the acquired image data to the preprocessing unit 220. The image data acquired by the input DMA unit 270 may be the image data stored by the output DMA unit 261, as well as, for example, image data image-processed by the image processing unit 300 and then stored in the DRAM 501.

The image processing unit 300 acquires (reads) the image data stored in the DRAM 501. The image processing unit 300 performs various image processing such as noise removal, a distortion aberration correction process, a YC conversion process, a resizing process, a JPEG compression process, and a video compression process such as an MPEG compression process or an H.264 compression process on the acquired image data to generate image data for display or image data for recording. Also, the image processing unit 300 stores (writes) the generated image data for display or the generated image data for recording in the DRAM 501 again.

Further, the image processing unit 300 acquires (reads) the image data for recording stored in the DRAM 501, and generates image data for display by performing various image processing, such as a video decompression process such as a JPEG decompression process, an MPEG decompression process or an H.264 decompression process. Also, the image processing unit 300 stores (writes) the generated image data for display in the DRAM 501 again. Since the configuration or the operation of the image processing unit 300 is the same as, for example, that of the image processing unit included in the conventional imaging apparatus illustrated in FIG. 10, a detailed description thereof will be omitted here.

The display processing unit 400 acquires (reads) the image data for display stored in the DRAM 501. The display processing unit 400 performs a display process, such as a process of superimposing OSD (On-Screen Display) display data on the acquired image data for display. Also, the display processing unit 400 outputs the generated image data for display to the display device 401 or an external display, which is not shown. Since the configuration or the operation of the display processing unit 400 is the same as, for example, that of the display processing unit included in the conventional imaging apparatus illustrated in FIG. 10, a detailed description will be omitted.

The display device 401 is a display device such as a TFT (thin film transistor) liquid crystal display (LCD) or an organic EL (Electro Luminescence) display. The display device 401 displays an image according to the image data after display processing output from the display processing unit 400. Since the display device 401 is the same as, for example, the display device included in the conventional imaging apparatus illustrated in FIG. 10, a detailed description thereof will be omitted here.

The DRAM controller 500 performs control of storing (writing) of data in the connected DRAM 501 and acquiring (reading) of data from the DRAM 501 in response to a request for access to the DRAM 501 from a plurality of components in the imaging apparatus 10 connected to the data bus 700, for example, a DMA access request. Since the configuration or the operation of the DRAM controller 500 is the same as, for example, that of the DRAM controller included in the conventional imaging apparatus illustrated in FIG. 10, a detailed description thereof will be omitted here.

The DRAM 501 is a memory that is access-controlled by the DRAM controller 500. The DRAM 501 records various data in the processes of the respective components in the imaging apparatus 10. Since the DRAM 501 is the same as, for example, the DRAM included in the conventional imaging apparatus illustrated in FIG. 10, a detailed description will be omitted here.

The CPU 600 controls the components of the imaging apparatus 10, i.e., the entire imaging apparatus 10. For example, the CPU 600 controls operation of each component in the imaging apparatus 10 according to a photography operation or a reproduction operation in the imaging apparatus 10. For example, when the imaging apparatus 10 performs the photography operation, the CPU 600 controls start of output of the pixel signal from the image sensor 100 and start of acquisition of the pixel signal by the imaging IF unit 210.

Further, the CPU 600 performs setting or control of the processing units 222a to 222c in the preprocessing unit 220, setting or control of the AE evaluation value generation unit 231, the AWB evaluation value generation unit 241, and the AF evaluation value generation unit 251, or setting of the output DMA unit 261 and the input DMA unit 270. Further, the CPU 600 controls selection of the image data by the selector 221, the selector 230, the selector 240, the selector 250, and the selector 260 in the preprocessing unit 220.

With this configuration, the imaging apparatus 10 of the present embodiment can immediately generate the AE evaluation value, the AWB evaluation value, and the AF evaluation value for control of AE, AWB and AF for photography while acquiring a pixel signal output from the image sensor 100 in real time, as in the conventional imaging apparatus. Further, in the imaging apparatus 10 of the present embodiment, it is possible to generate the AE evaluation value, the AWB evaluation value, and the AF evaluation value for control of AE, AWB and AF for photography based on the image data stored in the DRAM 501 by acquiring the image data stored in the DRAM 501 using the input DMA unit 270. That is, in the imaging apparatus 10 of the present embodiment, it is possible to generate the AE evaluation value, the AWB evaluation value, and the AF evaluation value from data other than the image data input in real time.

An example of an operation of generating the AE evaluation value, the AWB evaluation value, and the AF evaluation value in the imaging apparatus 10 of the present embodiment will be described herein.

<First Evaluation Value Generation Operation>

Figure 2:
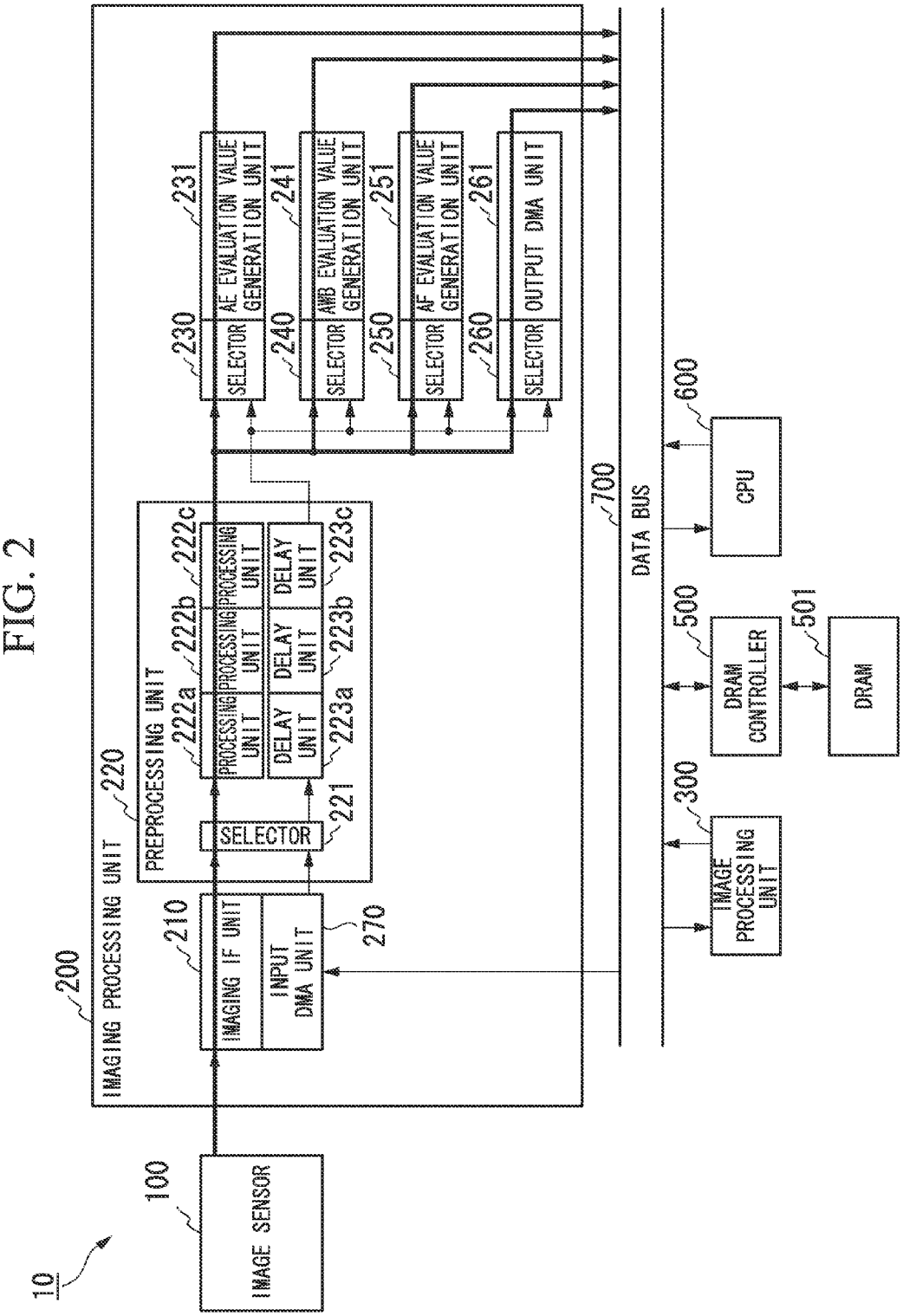
FIG. 2 is a diagram schematically illustrating an example of a first evaluation value generation operation according to the imaging apparatus of the present embodiment.

FIG. 2 is a diagram schematically illustrating an example of a first evaluation value generation operation in the imaging apparatus 10 of the present embodiment. The first evaluation value generation operation is an operation similar to the evaluation value generation operation of the conventional imaging apparatus. In the first evaluation value generation operation, the pixel signal from the image sensor 100 is output, and simultaneously, an AE evaluation value, an AWB evaluation value, and an AF evaluation value are generated in real time. In FIG. 2, paths of data in the first evaluation value generation operation are shown on the block diagram of the imaging apparatus 10 illustrated in FIG. 1.

In the first evaluation value generation operation, the pixel signal output from the image sensor 100 is input to the imaging processing unit 200. The imaging IF unit 210 in the imaging processing unit 200 outputs the input pixel signal as image data to the preprocessing unit 220. Also, the selector 221 in the preprocessing unit 220 sends the image data input from the imaging IF unit 210 to the processing unit 222a. The respective processing units 222a to 222c sequentially perform preprocessing (correction process) on the input image data. The preprocessing unit 220 outputs preprocessed image data after the preprocessing (correction process) in the processing unit 222c to each of the selector 230, the selector 240, the selector 250, and the selector 260. Also, the selector 230, the selector 240, the selector 250, and the selector 260 output the preprocessed image data input from the preprocessing unit 220 to the AE evaluation value generation unit 231, the AWB evaluation value generation unit 241, the AF evaluation value generation unit 251 and the output DMA unit 261 corresponding thereto, respectively.

The AE evaluation value generation unit 231, the AWB evaluation value generation unit 241, the AF evaluation value generation unit 251, and the output DMA unit 261 store the AE evaluation value, the AWB evaluation value, and the AF evaluation value, which are calculated (generated) based on the preprocessed image data input from the preprocessing unit 220, and the preprocessed image data (Bayer data) input from the preprocessing unit 220, in the DRAM 501 via the DRAM controller 500, respectively.

Thus, in the first evaluation value generation operation, the CPU 600 selects paths for processing the image data according to the pixel signal output from the image sensor 100 as illustrated in FIG. 2, using the selector 221, the selector 230, the selector 240, the selector 250, and the selector 260. Thus, even in the imaging apparatus 10 of the present embodiment, it is possible to perform the same operation as the evaluation value generation operation in the conventional imaging apparatus.

<Second Evaluation Value Generation Operation>

Figure 3A:
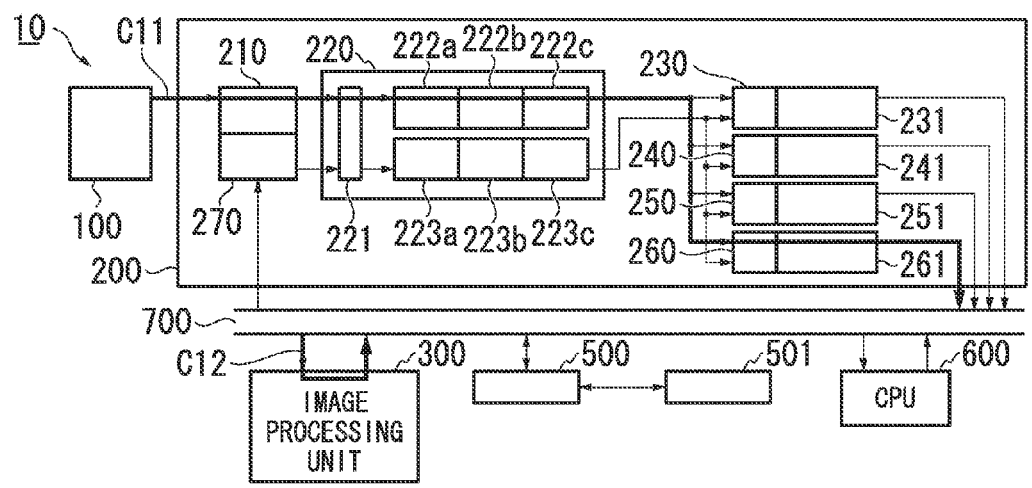
FIG. 3A is a diagram schematically illustrating an example of a second evaluation value generation operation according to the imaging apparatus of the present embodiment.
Figure 3B:
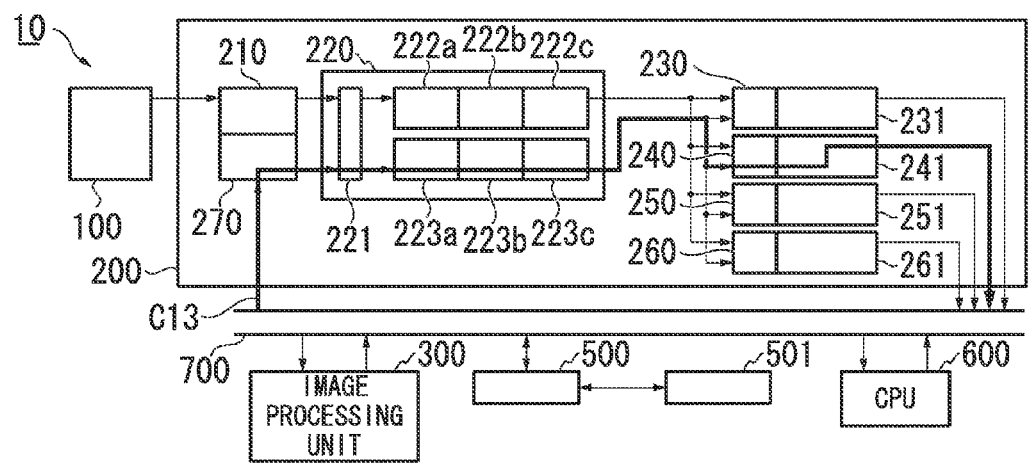
FIG. 3B is a diagram schematically illustrating an example of the second evaluation value generation operation according to the imaging apparatus of the present embodiment.

FIGS. 3A and 3B are diagrams schematically illustrating an example of a second evaluation value generation operation according to the imaging apparatus 10 of the present embodiment. In the second evaluation value generation operation, after the image data according to the pixel signal from the image sensor 100 is first stored in the DRAM 501, the image processing unit 300 performs image processing based on the image data stored in the DRAM 501 and then stores a result in the DRAM 501 again. The image processing unit 300 generates an evaluation value based on the image data after the image processing stored in the DRAM 501. In FIGS. 3A and 3B, paths of data in respective process procedures of the second evaluation value generation operation are shown on the block diagram of the imaging apparatus 10 illustrated in FIG. 1.

Hereinafter, the respective process procedures in the second evaluation value generation operation will be described in order.

In the second evaluation value generation operation, generation of an evaluation value is performed in the following procedures.

(Procedure 1): First, the imaging apparatus 10 preprocesses the image data according to the pixel signal output from the image sensor 100, and stores preprocessed image data after the preprocessing in the DRAM 501 as the original image data (Bayer data). More specifically, the pixel signal output from the image sensor 100 is input to the imaging processing unit 200, and the imaging IF unit 210 in the imaging processing unit 200 outputs the input pixel signal to the preprocessing unit 220 as image data.

Also, the preprocessing unit 220 sequentially performs preprocessing (a correction process) on the image data input from the imaging IF unit 210 using the respective processing units 222a to 222c, and outputs the preprocessed image data obtained by the preprocessing (correction process) in the processing unit 222c to the output DMA unit 261 via the selector 260. The output DMA unit 261 stores the preprocessed image data (Bayer data) input from the preprocessing unit 220 in the DRAM 501 via the DRAM controller 500.

In procedure 1, the CPU 600 selects, for example, a path C11 illustrated in FIG. 3A as a data path using the selector 221, the selector 230, the selector 240, the selector 250, and the selector 260.

(Procedure 2): Subsequently, the imaging apparatus 10 performs image processing on the preprocessed image data (Bayer data) stored in the DRAM 501 and stores the image data after the image processing in the DRAM 501 again. More specifically, the image processing unit 300, which acquires (reads) the image data stored in the DRAM 501 via the DRAM controller 500, performs, for example, image processing, such as an image synthesis process, a noise removal process, a distortion aberration correction process, or an editing process to change color of the image in response to a request of a user of the imaging apparatus 10, on the acquired image data.

Also, the image processing unit 300 stores the image data after the image processing in the DRAM 501 via the DRAM controller 500 again. In procedure 2, for example, the data is input or output to or from the image processing unit 300 along a path C12 illustrated in FIG. 3A.

(Procedure 3) Subsequently, the imaging apparatus 10 generates an evaluation value based on the image data after the image processing stored in the DRAM 501. More specifically, the input DMA unit 270 in the imaging processing unit 200 acquires (reads) the image data after the image processing stored in the DRAM 501 via the DRAM controller 500, and outputs the acquired image data after the image processing to the preprocessing unit 220. Then, the selector 221 in the preprocessing unit 220 sends the image data after the image processing input from the input DMA unit 270 to the delay unit 223a, and each of the delay units 223a to 223c delays the input image data after the image processing by a predetermined time.

The preprocessing unit 220 outputs the delayed image data from the delay unit 223c to the AWB evaluation value generation unit 241 via the selector 240. Also, the AWB evaluation value generation unit 241 calculates (generates) the AWB evaluation value based on the delayed image data input from the preprocessing unit 220 via the selector 240, i.e., the image data after the image processing, and stores the generated AWB evaluation value in the DRAM 501 via the DRAM controller 500.

In procedure 3, the CPU 600 selects, for example, a path C13 illustrated in FIG. 3B as the data path using the selector 221, the selector 230, the selector 240, the selector 250, and the selector 260.

Thus, in the second evaluation value generation operation, the CPU 600 selects the paths for processing the image data as illustrated in FIGS. 3A and 3B in the respective process procedures using the selector 221, the selector 230, the selector 240, the selector 250, and the selector 260. Thus, the imaging apparatus 10 of the present embodiment first stores the image data according to the pixel signal from the image sensor 100 in the DRAM 501. The image processing unit 300 can generate an evaluation value based on the image data after the image processing, i.e., the image data stored in the DRAM 501. Thus, for example, the AWB evaluation value is possible to be generated for image data after addition of a plurality of images (an image synthesis process) and the image data after image processing such as a noise removal process or a distortion aberration correction process.

In the second evaluation value generation operation illustrated in FIGS. 3A and 3B, the example in which the AE evaluation value generation unit 231, the AWB evaluation value generation unit 241, and the AF evaluation value generation unit 251 do not generate the evaluation values in procedure 1 has been described. However, in procedure 1, the AE evaluation value generation unit 231, the AWB evaluation value generation unit 241 and the AF evaluation value generation unit 251 may generate the respective evaluation values.

Further, the example in which the AE evaluation value generation unit 231 and the AF evaluation value generation unit 251 do not generate the evaluation values in procedure 3 has been described. However, in procedure 3, the AE evaluation value generation unit 231 and the AF evaluation value generation unit 251 may generate the respective evaluation values based on the image data after the image processing input from the preprocessing unit 220.

<Third Evaluation Value Generation Operation>

Figure 4A:
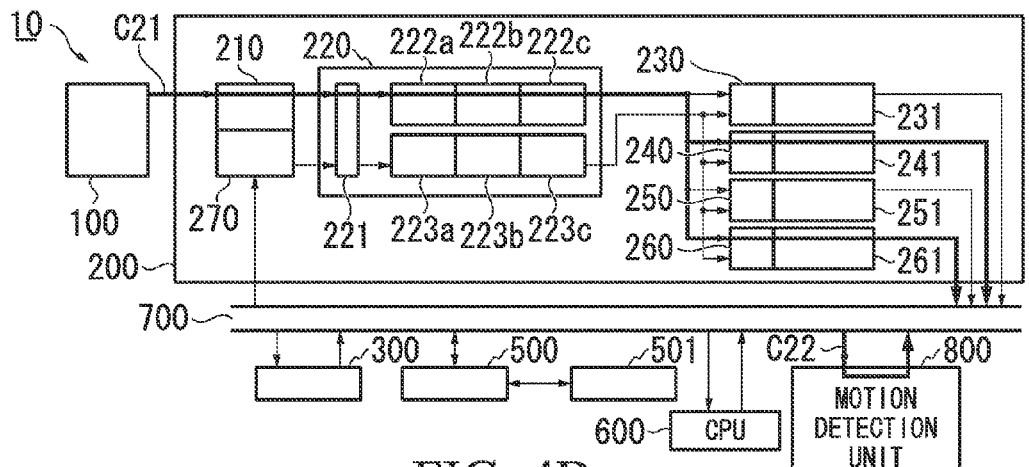
FIG. 4A is a diagram schematically illustrating an example of a third evaluation value generation operation according to the imaging apparatus of the present embodiment.
Figure 4B:
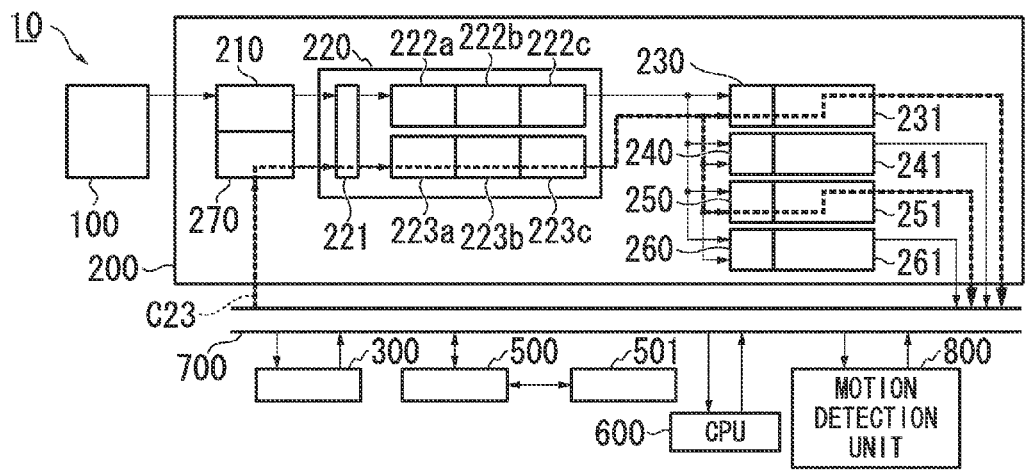
FIG. 4B is a diagram schematically illustrating an example of the third evaluation value generation operation according to the imaging apparatus of the present embodiment.

FIGS. 4A and 4B are diagrams schematically illustrating an example of a third evaluation value generation operation according to the imaging apparatus 10 of the present embodiment. In the third evaluation value generation operation, after the image data according to the pixel signal from the image sensor 100 is first stored in the DRAM 501, an evaluation value is generated based on the image data stored in the DRAM 501. However, in the third evaluation value generation operation, the AE evaluation value and the AF evaluation value are generated while tracking a subject.

The imaging apparatus 10 that performs the third evaluation value generation operation further includes a motion detection unit 800, in addition to the imaging apparatus 10 illustrated in FIG. 1. In FIGS. 4A and 4B, the motion detection unit 800 for the third evaluation value generation operation is added, and paths of data in respective process procedures of the third evaluation value generation operation are shown on the block diagram of the imaging apparatus 10 illustrated in FIG. 1.

The motion detection unit 800 acquires (reads) the image data stored in the DRAM 501 and performs, for example, processing such as block matching to compare two images, on the acquired image data, to detect a motion vector of the subject as a motion of the subject contained in the image data. Then, the motion detection unit 800 generates information indicating the detected motion of the subject, and stores the generated information indicating the motion of the subject in the DRAM 501 via the DRAM controller 500. Since a configuration and an operation of the motion detection unit 800 are the same as, for example, the configuration and the operation of the motion detection unit included in the conventional imaging apparatus, a detailed description thereof will be omitted.

The motion detection unit 800 may be configured to hold the generated information indicating the motion of the subject in a register within the motion detection unit 800, instead of storing the generated information indicating the motion of the subject in the DRAM 501. In this case, after receiving a notification indicating that the generation of the information indicating the motion of the subject has been completed from the motion detection unit 800, the CPU 600 reads the information indicating the motion of the subject held in the register of the motion detection unit 800. Using the read information indicating the motion of the subject, the CPU 600 performs setting or control of the AE evaluation value generation unit 231 and the AF evaluation value generation unit 251.

Hereinafter, respective process procedures in the third evaluation value generation operation will be described in order. In the third evaluation value generation operation, generation of respective evaluation values is performed in the following procedures.

(Procedure 1): First, the imaging apparatus 10 preprocesses image data according to the pixel signal output from the image sensor 100, generates an AWB evaluation value based on the preprocessed image data after the preprocessing, and stores the preprocessed image data after the preprocessing in the DRAM 501 as original image data (Bayer data). More specifically, the pixel signal output from the image sensor 100 is input to the imaging processing unit 200, and the imaging IF unit 210 in the imaging processing unit 200 outputs the input pixel signal to the preprocessing unit 220 as image data.

Also, the preprocessing unit 220 sequentially performs preprocessing (correction process) on the image data input from the imaging IF unit 210 using the respective processing units 222a to 222c, and outputs the preprocessed image data after the preprocessing (correction process) in the processing unit 222c to the AWB evaluation value generation unit 241 via the selector 240 and to the output DMA unit 261 via the selector 260. Also, based on the preprocessed image data input from the preprocessing unit 220, the AWB evaluation value generation unit 241 calculates (generates) the AWB evaluation value, and stores the generated AWB evaluation value in the DRAM 501 via the DRAM controller 500. In addition, the output DMA unit 261 stores the preprocessed image data (Bayer data) input from the preprocessing unit 220 in the DRAM 501 via the DRAM controller 500.

In procedure 1, the CPU 600 selects, for example, a path C21 illustrated in FIG. 4A as the data path using the selector 221, the selector 230, the selector 240, the selector 250, and the selector 260.

(Procedure 2): Subsequently, the imaging apparatus 10 detects the motion of the subject based on the preprocessed image data (Bayer data) stored in the DRAM 501. More specifically, the motion detection unit 800 acquires (reads) the image data stored in the DRAM 501 via the DRAM controller 500. The motion detection unit 800 detects the motion of the subject contained in the acquired image data.

Also, the motion detection unit 800 stores the information indicating the detected motion of the subject in the DRAM 501 via the DRAM controller 500. In procedure 2, for example, the data is input or output to or from the motion detection unit 800 along a path C22 illustrated in FIG. 4A. Then, based on the information indicating the motion of the subject detected by the motion detection unit 800, the CPU 600 performs the setting of the AE evaluation value generation unit 231 and the AF evaluation value generation unit 251.

(Procedure 3): Subsequently, the imaging apparatus 10 generates the AE evaluation value and the AF evaluation value based on the original image data (Bayer data) stored in the DRAM 501 using the AE evaluation value generation unit 231 and the AF evaluation value generation unit 251. More specifically, the input DMA unit 270 in the imaging processing unit 200 acquires (reads) the preprocessed image data (Bayer data) stored in the DRAM 501 via the DRAM controller 500. The input DMA unit 270 outputs the acquired preprocessed image data (Bayer data) to the preprocessing unit 220. Also, the selector 221 in the preprocessing unit 220 sends the preprocessed image data (Bayer data) input from the input DMA unit 270 to the delay unit 223a, and each of the delay units 223a to 223c delays the input preprocessed image data (Bayer data) by a predetermined time.

The preprocessing unit 220 outputs the delayed image data from the delay unit 223c to the AE evaluation value generation unit 231 via the selector 230 and to the AF evaluation value generation unit 251 via the selector 250. Also, the AE evaluation value generation unit 231 calculates (generates) the AE evaluation value based on the delayed image data input from the preprocessing unit 220 via the selector 230, i.e., the preprocessed image data (Bayer data), and stores the generated AE evaluation value in the DRAM 501 via the DRAM controller 500. The AF evaluation value generation unit 251 calculates (generates) the AF evaluation value based on the delayed image data input from the preprocessing unit 220 via the selector 250, i.e., the preprocessed image data (Bayer data), and stores the generated AF evaluation value in the DRAM 501 via the DRAM controller 500.

In procedure 3, the CPU 600 selects, for example, a path C23 illustrated in FIG. 4B as the data path using the selector 221, the selector 230, the selector 240, the selector 250, and the selector 260.

Thus, in the third evaluation value generation operation, the CPU 600 selects the paths for processing the image data as illustrated in FIGS. 4A and 4B in the respective process procedures using the selector 221, the selector 230, the selector 240, the selector 250, and the selector 260. Thus, the imaging apparatus 10 of the present embodiment first stores the image data according to the pixel signal from the image sensor 100 in the DRAM 501. The motion detection unit 800 detects the motion of the subject. Accordingly, it is possible to perform control of the AE or AF with respect to a position (region) of the image data according to the motion of the subject.

Also, in the imaging apparatus 10 of the present embodiment, the AE evaluation value generation unit 231 and the AF evaluation value generation unit 251 generate the AE evaluation value and the AF evaluation value from the image data used to detect the motion of the subject based on the information indicating the motion of the subject detected by the motion detection unit 800. Thus, it is possible to generate the AE evaluation value and the AF evaluation value while tracking the motion of the subject.

When the respective evaluation values are generated while tracking the motion of the subject, if procedures 1 to 3 are sequentially performed as in the third evaluation value generation operation as illustrated in FIGS. 4A and 4B, the acquisition of the image data according to the pixel signal from the image sensor 100 and the generation of the evaluation value according to the motion of the subject are alternately performed. Therefore, for example, since, in the imaging apparatus 10, the image data that the imaging IF unit 210 acquires from the image sensor 100 is decimated and processed, accuracy of the evaluation value generation may be degraded and a user of the imaging apparatus 10 may feel uncomfortable. Therefore, in the actual operation of the third evaluation value generation operation, it is possible to prevent the user of the imaging apparatus 10 from feeling uncomfortable by suppressing the degradation of the accuracy of the evaluation value generation as described above by simultaneously performing procedures 1 to 3 of the third evaluation value generation operation illustrated in FIGS. 4A and 4B.

<Actual Operation in Third Evaluation Value Generation Operation>

Figure 5:
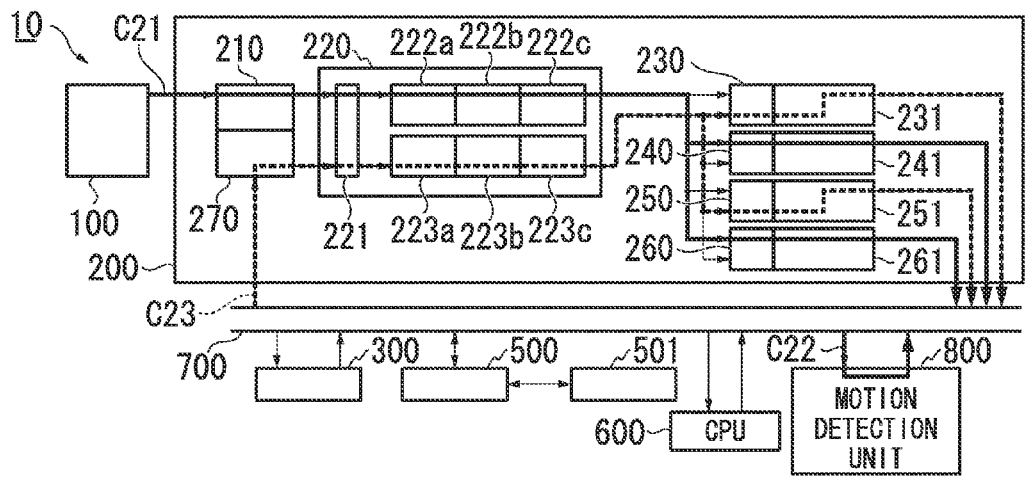
FIG. 5 is a diagram schematically illustrating an example of an actual operation in the third evaluation value generation operation according to the imaging apparatus of the present embodiment.

FIG. 5 is a diagram schematically illustrating an example of actual operation in the third evaluation value generation operation according to the imaging apparatus 10 of the present embodiment. In FIG. 5, the paths of the data in the process of procedures 1 to 3 of the third evaluation value generation operation illustrated in FIGS. 4A and 4B, which are performed simultaneously in the actual operation in the third operation, are shown to correspond to the third evaluation value generation operation illustrated in FIGS. 4A and 4B.

Even in the actual operation of the third evaluation value generation operation illustrated in FIG. 5, the storage of the image data according to the pixel signal from the image sensor 100 in the DRAM 501 (procedure 1), the detection of the motion of the subject in the motion detection unit 800 (procedure 2), and the generation of the evaluation value based on the image data stored in the DRAM 501 (procedure 3) are performed, as in the third evaluation value generation operation illustrated in FIGS. 4A and 4B. However, in the actual operation of the third evaluation value generation operation illustrated in FIG. 5, the process of procedure 1, 2 or 3 is performed on each piece of image data that the imaging IF unit 210 acquires from the image sensor 100 at a different timing.

More specifically, when the imaging IF unit 210 acquires first image data from the image sensor 100, the imaging processing unit 200 performs the calculation (generation) of the AWB evaluation value based on first preprocessed image data using the AWB evaluation value generation unit 241, and the storage of the first preprocessed image data (Bayer data) in the DRAM 501 using the output DMA unit 261, through procedure 1 (see the path C21).

Then, when the imaging IF unit 210 acquires second image data from the image sensor 100, the imaging processing unit 200 performs the calculation (generation) of the AWB evaluation value based on second preprocessed image data using the AWB evaluation value generation unit 241 and the storage of the second preprocessed image data (Bayer data) in the DRAM 501 using the output DMA unit 261 through procedure 1 (see the path C21). Further, simultaneously, the motion detection unit 800 detects the motion of the subject based on the first preprocessed image data (Bayer data) and the second preprocessed image data (Bayer data) stored in the DRAM 501 through procedure 2 (see the path C22).

Then, when the imaging IF unit 210 acquires third image data from the image sensor 100, the imaging processing unit 200 performs the calculation (generation) of the AWB evaluation value based on third preprocessed image data using the AWB evaluation value generation unit 241 and the storage of the third preprocessed image data (Bayer data) in the DRAM 501 using the output DMA unit 261 through procedure 1 (see the path C21). At the same time, the motion detection unit 800 detects the motion of the subject based on the second preprocessed image data (Bayer data) and the third preprocessed image data (Bayer data) stored in the DRAM 501 through procedure 2 (see the path C22). Further, at the same time, in the imaging processing unit 200, the input DMA unit 270 acquires (reads) the first preprocessed image data stored in the DRAM 501, and the AE evaluation value generation unit 231 and the AF evaluation value generation unit 251 perform calculation (generation) of the AE evaluation value and the AF evaluation value based on the delayed image data obtained by each of delay units 223a to 223c delaying the first preprocessed image data, through procedure 3 (see the path C23).

Then, the imaging processing unit 200 repeats the calculation (generation) of the AWB evaluation value based on the preprocessed image data and the storage of the preprocessed image data (Bayer data) in the DRAM 501 in procedure 1, and the calculation (generation) of the AE evaluation value and the AF evaluation value based on the preprocessed image data stored in the DRAM 501 in procedure 3. Further, at the same time, the motion detection unit 800 repeats the detection of the motion of the subject in procedure 2. For example, if each piece of image data that the imaging IF unit 210 acquires from the image sensor 100 is a "frame," when an Nth frame is stored in the DRAM 501, the motion of the subject is detected based on (N−1)th and Nth frames, and calculation (generation) of the AE evaluation value and the AF evaluation value is performed based on an (N−2)th frame.

Thus, in the actual operation of the third evaluation value generation operation, the respective evaluation values can be generated while storing the image data according to the pixel signal from the image sensor 100 in the DRAM 501 by simultaneously performing procedures 1 to 3 of the third evaluation value generation operation illustrated in FIGS. 4A and 4B. That is, in the imaging apparatus 10 of the present embodiment, the image data according to the pixel signal that the imaging IF unit 210 acquires from the image sensor 100 in real time, and the previously acquired different image data is possible to be processed simultaneously. This is performed in the selector 221 and the delay units 223a to 223c provided in the preprocessing unit 220.

Further, for example, a method by which the CPU 600 controls a timing at which the input DMA unit 270 acquires (reads) the image data stored in the DRAM 501 in consideration of a delay time (processing time) of the process in the preprocessing unit 220 is considered as a method of simultaneously processing different image data that the imaging IF unit 210 acquires at the different timings. However, it is easy for the control of the timing by the CPU 600 to become complicated. In the imaging apparatus 10 of the present embodiment, since the delay units 223a to 223c are provided in the preprocessing unit 220, a timing of the previously acquired different image data can easily be the same as the timing of the image data preprocessed in real time.

More specifically, the image data input from the imaging IF unit 210 in real time is sent to the processing unit 222a by the selector 221. The image data previously acquired by the imaging IF unit 210, which is input from the input DMA unit 270, is sent to the delay unit 223a. Also, the delay units 223a to 223c cause the image data previously acquired by the imaging IF unit 210 to be at the same timing as the image data subjected to preprocessing (a correction process) by the processing units 222a to 222c in real time. That is, the image data is input to the AE evaluation value generation unit 231, the AWB evaluation value generation unit 241, the AF evaluation value generation unit 251, and the output DMA unit 261 at the same timing. Accordingly, the AE evaluation value generation unit 231, the AWB evaluation value generation unit 241, the AF evaluation value generation unit 251, and the output DMA unit 261 can simultaneously process different image data that is acquired at different timings by the imaging IF unit 210. Thus, in the imaging apparatus 10 of the present embodiment, it is possible to suppress degradation of the accuracy of the evaluation value generation that occurs by sequentially performing procedures 1 to 3 and reduce an uncomfortable feeling given to a user.

In the third evaluation value generation operation illustrated in FIGS. 4A and 4B and the actual operation of the third evaluation value generation operation illustrated in FIG. 5, the case in which the motion detection unit 800 detects the motion of the subject and the AE evaluation value and the AF evaluation value are generated by tracking the motion of the subject has been described. However, the third evaluation value generation operation and the actual operation thereof are not limited to the case of generating the evaluation values while tracking the motion of the subject, and, for example, the evaluation values may be generated while performing hand shake correction or the evaluation value may be generated while performing face detection. In this case, the imaging apparatus 10 may include a hand shake correction unit and a face detection unit in place of the motion detection unit 800 or in addition to the motion detection unit 800, thereby generating the evaluation values while performing the hand shake correction or the face detection.

<Fourth Evaluation Value Generation Operation>

Figure 6A:
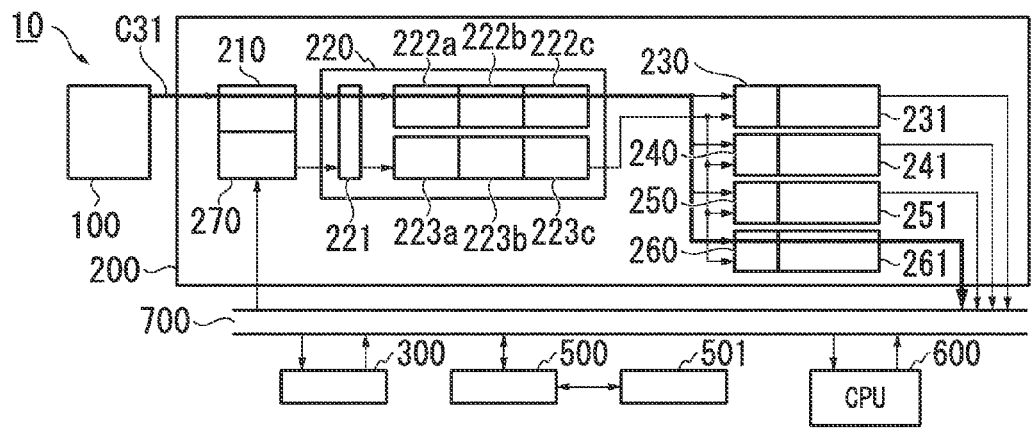
FIG. 6A is a diagram schematically illustrating an example of an operation of a fourth evaluation value generation according to the imaging apparatus of the present embodiment.
Figure 6B:
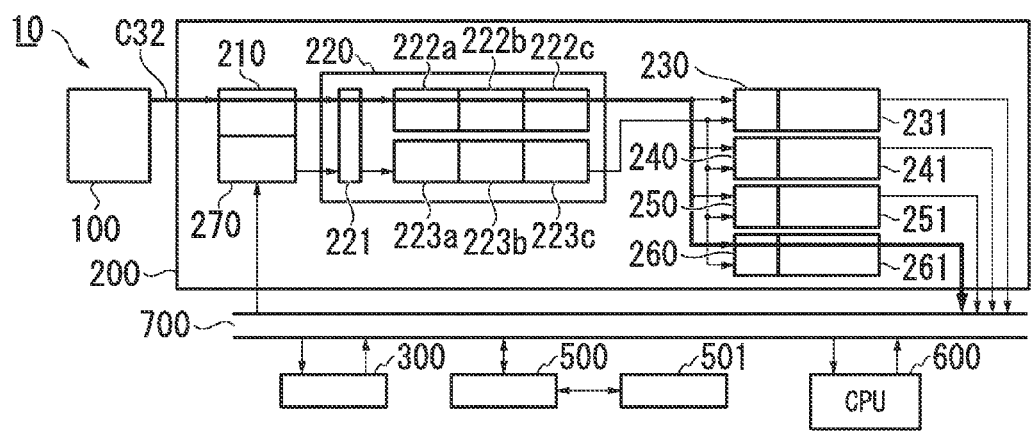
FIG. 6B is a diagram schematically illustrating an example of the operation of the fourth evaluation value generation according to the imaging apparatus of the present embodiment.
Figure 6C:
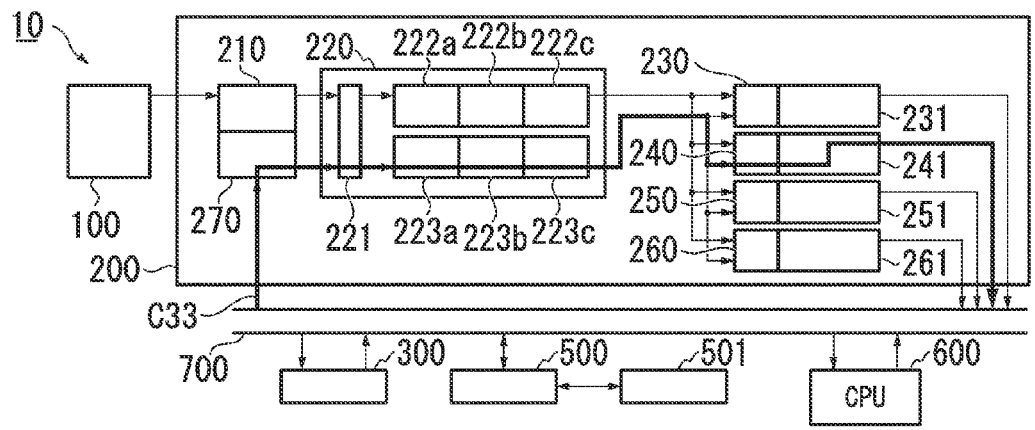
FIG. 6C is a diagram schematically illustrating an example of the operation of the fourth evaluation value generation according to the imaging apparatus of the present embodiment.

FIGS. 6A, 6B and 6C are diagrams schematically illustrating an example of a fourth evaluation value generation operation according to the imaging apparatus 10 of the present embodiment. In the fourth evaluation value generation operation, the pixel signal from the image sensor 100 is divided a plurality of times and then is input. This is an operation of generating the evaluation value in a so-called interlaced reading image sensor. In the fourth evaluation value generation operation, each image data according to the pixel signal divided a plurality of times and then input from the image sensor 100 is first stored in the DRAM 501 and then the respective image data stored in the DRAM 501 are combined into one piece of image data, and the evaluation value is generated based on the one piece of image data. In FIGS. 6A, 6B and 6C, a path of data in each process procedure of the fourth evaluation value generation operation is shown on the block diagram of the imaging apparatus 10 illustrated in FIG. 1.

In the interlaced reading image sensor, a 2:1 interlace in which a pixel signal of one image is, for example, divided into two fields of an odd field (ODD) and an even field (EVEN) and then read is adopted or a pixel signal is divided into 3 to 6 fields and then read. There are various formats such as a 3:1 interlace, a 4:1 interlace, a 5:1 interlace, and a 6:1 interlace. In the following description, a case in which the image sensor 100 is a 2:1 interlace image sensor will be described. For image sensors of other formats, since only the number of fields that constitute one image is different, the image sensors may be considered like the 2:1 interlace image sensor that will be described below.

Hereinafter, respective process procedures in the fourth evaluation value generation operation will be described in order.

In the fourth evaluation value generation operation, generation of the respective evaluation values is performed in the following procedure.

(Procedure 1): First, the imaging apparatus 10 preprocesses image data of an odd field according to a pixel signal of the odd field output from the image sensor 100. The imaging apparatus 10 stores preprocessed image data of the odd field after the preprocessing in the DRAM 501 as original image data (Bayer data) of the odd field. More specifically, the pixel signal of the odd field output from the image sensor 100 is input to the imaging processing unit 200, and the imaging IF unit 210 in the imaging processing unit 200 outputs the input pixel signal to the preprocessing unit 220 as the image data of the odd field.

Also, the preprocessing unit 220 sequentially performs preprocessing (correction process) on the image data of the odd field input from the imaging IF unit 210 using the respective processing units 222a to 222c. The preprocessed image data of the odd field after the preprocessing (correction process) in the preprocessing unit 222c is output to the output DMA unit 261 via the selector 260. Also, the output DMA unit 261 stores the preprocessed image data of the odd field (Bayer data) input from the preprocessing unit 220 in the DRAM 501 via the DRAM controller 500.

In procedure 1, the CPU 600 selects, for example, a path C31 illustrated in FIG. 6A as a data path using the selector 221, the selector 230, the selector 240, the selector 250, and the selector 260.

(Procedure 2): Subsequently, the imaging apparatus 10 preprocesses image data of an even field according to a pixel signal of the even field output from the image sensor 100. The imaging apparatus 10 stores preprocessed image data of the even field after the preprocessing in the DRAM 501 as original image data of the even field (Bayer data). More specifically, the pixel signal of the even field output from the image sensor 100 is input to the imaging processing unit 200, and the imaging IF unit 210 in the imaging processing unit 200 outputs the input pixel signal to the preprocessing unit 220 as image data of the even field.

Also, the preprocessing unit 220 sequentially performs preprocessing (correction process) on the image data of the even field input from the imaging IF unit 210 using the respective processing units 222a to 222c. The preprocessed image data of the even field after the preprocessing (correction process) in the processing unit 222c is output to the output DMA unit 261 via the selector 260. The output DMA unit 261 stores the preprocessed image data of the even field (Bayer data) input from the preprocessing unit 220 in the DRAM 501 via the DRAM controller 500.

In procedure 2, the CPU 600 selects, for example, a path C32 illustrated in FIG. 6B as the data path using the selector 221, the selector 230, the selector 240, the selector 250, and the selector 260.

(Procedure 3): Subsequently, the imaging apparatus 10 generates the AWB evaluation value based on the original image data of the odd field (Bayer data) and the original image data of the even field (Bayer data) stored in the DRAM 501 using the AWB evaluation value generation unit 241. More specifically, the input DMA unit 270 in the imaging processing unit 200 acquires (reads) the preprocessed image data of the odd field (Bayer data) and the preprocessed image data of the even field (Bayer data) stored in the DRAM 501, via the DRAM controller 500, and outputs the preprocessed image data to the preprocessing unit 220.

Here, when the input DMA unit 270 acquires the preprocessed image data of the odd field and the preprocessed image data of the even field, for example, the input DMA unit 270 alternately reads the preprocessed image data of the odd field and the even field for each line of the image sensor 100. The input DMA unit 270 sequentially outputs the read preprocessed image data to output the preprocessed image data to the preprocessing unit 220 as one preprocessed image data (Bayer data).

Also, the selector 221 in the preprocessing unit 220 sends the one preprocessed image data (Bayer data) input from the input DMA unit 270 to the delay unit 223a. Each of the delay units 223a to 223c delays the one input preprocessed image data (Bayer data) by a predetermined time.

The preprocessing unit 220 outputs one delayed image data after delaying in the delay unit 223c to the AWB evaluation value generation unit 241 via the selector 240. Also, the AWB evaluation value generation unit 241 calculates (generates) the AWB evaluation value based on one delayed image data input from the preprocessing unit 220 via the selector 240, i.e., the one preprocessed image data (Bayer data) and stores the generated AWB evaluation value in the DRAM 501 via the DRAM controller 500.

In procedure 3, the CPU 600 selects, for example, a path C33 illustrated in FIG. 6C as the data path using the selector 221, the selector 230, the selector 240, the selector 250, and the selector 260.

Thus, in the fourth evaluation value generation operation, the CPU 600 selects the paths for processing the image data as illustrated in FIGS. 6A, 6B and 6C in the respective process procedures using the selector 221, the selector 230, the selector 240, the selector 250, and the selector 260. Accordingly, the imaging apparatus 10 of the present embodiment stores the image data according to the pixel signal of each field from the image sensor 100 in the DRAM 501. The input DMA unit 270 acquires (reads) the image data of each field as one image data, i.e., image data that is in a state in which the pixel signals of the respective fields are combined. Thus, in the imaging apparatus 10 of the present embodiment, it is possible to generate the AWB evaluation value based on the image data according to the pixel signal from the interlaced reading image sensor.

In the fourth evaluation value generation operation illustrated in FIGS. 6A, 6B and 6C, the case in which the image data of respective fields is first stored in the DRAM 501 in procedures 1 and 2 and the AWB evaluation value generation unit 241 generates the AWB evaluation value in procedure 3 has been described. In other words, the example in which the AE evaluation value generation unit 231, the AWB evaluation value generation unit 241, and the AF evaluation value generation unit 251 do not generate the evaluation values in procedures 1 and 2 and the AE evaluation value generation unit 231 and the AF evaluation value generation unit 251 do not generate the evaluation values in procedure 3 has been described. However, the fourth evaluation value generation operation is not limited to the case in which the AWB evaluation value generation unit 241 generates the AWB evaluation value, and the AE evaluation value generation unit 231, the AWB evaluation value generation unit 241 and the AF evaluation value generation unit 251 may generate the respective evaluation values in the respective procedures 1, 2, and 3.

Further, in the fourth evaluation value generation operation shown in FIGS. 6A, 6B and 6C, the case in which the preprocessing is performed on the pixel data of each field according to the image signal of each field from the image sensor 100 and then the preprocessed pixel data is stored in the DRAM 501 in procedures 1 and 2 has been described. However, a timing at which the preprocessing is performed on the image data is not limited to a timing of the fourth evaluation value generation operation shown in FIGS. 6A, 6B and 6C and, for example, the preprocessing may be performed after the image data of respective fields is combined as one image data.

Figure 7A:
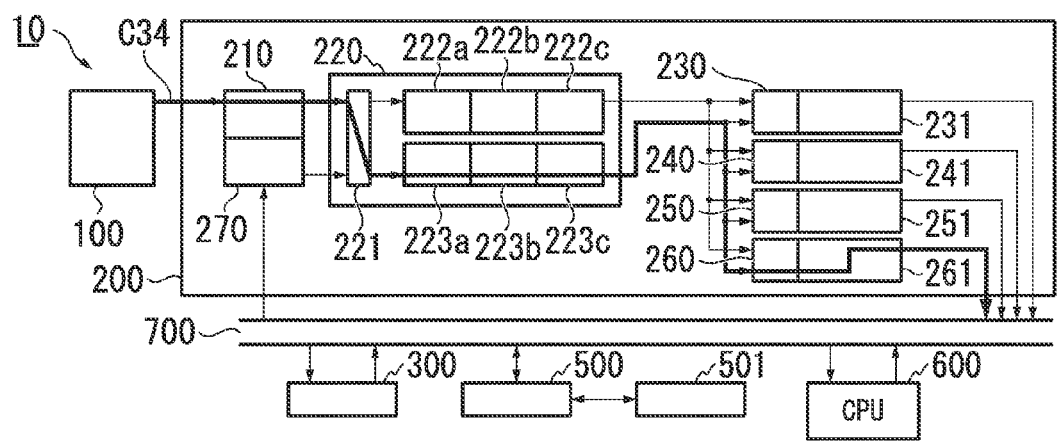
FIG. 7A is a diagram schematically illustrating an example of another operation in the fourth evaluation value generation operation according to the imaging apparatus of the present embodiment.
Figure 7B:
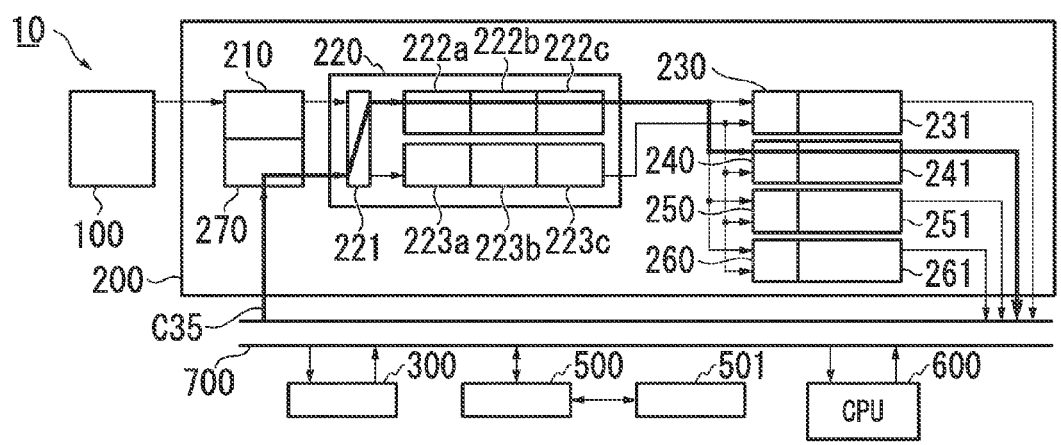
FIG. 7B is a diagram schematically illustrating an example of another operation in the fourth evaluation value generation operation according to the imaging apparatus of the present embodiment.

FIGS. 7A and 7B are diagrams schematically illustrating an example of another operation in the fourth evaluation value generation operation according to the imaging apparatus 10 of the present embodiment. Another operation of the fourth evaluation value generation operation illustrated in FIGS. 7A and 7B is an operation in which the preprocessing is not performed on the image data according to the pixel signal of each field output from the image sensor 100, but on one image data acquired (read) by the input DMA unit 270. In FIGS. 7A and 7B, the path of data in each process procedure of another operation of the fourth evaluation value generation operation is shown on the block diagram of the imaging apparatus 10 illustrated in FIG. 1. In another operation of the fourth evaluation value generation operation, generation of the respective evaluation values is performed in the following procedures.

(Procedure 1): First, the imaging apparatus 10 stores image data of an odd field according to a pixel signal of the odd field output from the image sensor 100 in the DRAM 501 as original image data of the odd field (Bayer data). More specifically, the pixel signal of the odd field output from the image sensor 100 is input to the imaging processing unit 200, and the imaging IF unit 210 in the imaging processing unit 200 outputs the input pixel signal to the preprocessing unit 220 as the image data of the odd field.

Also, the selector 221 in the preprocessing unit 220 sends the image data of the odd field input from the imaging IF unit 210 to the delay unit 223a, and each of the delay units 223a to 223c delays the input image data of the odd field by a predetermined time.

The preprocessing unit 220 outputs the delayed image data of the odd field after delaying in the delay unit 223c to the output DMA unit 261 via the selector 260. The output DMA unit 261 stores the delayed image data of the odd field input from the preprocessing unit 220 in the DRAM 501 via the DRAM controller 500.

(Procedure 2): Subsequently, the imaging apparatus 10 stores the image data of an even field according to the pixel signal of the even field output from the image sensor 100 in the DRAM 501 as original image data of the even field (Bayer data). More specifically, the pixel signal of the even field output from the image sensor 100 is input to the imaging processing unit 200, and the imaging IF unit 210 in the imaging processing unit 200 outputs the input image signal to the preprocessing unit 220 as the pixel data of the even field.

Also, the selector 221 in the preprocessing unit 220 sends the image data of the even field input from the imaging IF unit 210 to the delay unit 223a, and each of the delay units 223a to 223c delays the input image data of the even field by a predetermined time.

The preprocessing unit 220 outputs the delayed image data of the even field after the delaying in the delay unit 223c to the output DMA unit 261 via the selector 260. Also, the output DMA unit 261 stores the delayed image data of the even field input from the preprocessing unit 220 in the DRAM 501 via the DRAM controller 500.

In procedures 1 and 2, the CPU 600 selects, for example, a path C34 illustrated in FIG. 7A as the data path using the selector 221, the selector 230, the selector 240, the selector 250, and the selector 260.

(Procedure 3): Subsequently, the imaging apparatus 10 generates the AWB evaluation value based on the original image data of the odd field (Bayer data) and the original image data of the even field (Bayer data) stored in the DRAM 501 using the AWB evaluation generation unit 241. More specifically, the input DMA unit 270 in the imaging processing unit 200 acquires (reads) the delayed image data of the odd field (Bayer data) and the delayed image data of the even field (Bayer data) stored in the DRAM 501, via the DRAM controller 500, and outputs the delayed image data to the preprocessing unit 220.

When the input DMA unit 270 acquires the delayed image data of the odd field and the delayed image data of the even field, the input DMA unit 270 acquires (reads) image data that is in a state in which the pixel signals of the respective fields are combined, i.e., the delayed image data of the respective fields, as one image data using the method as described above, and then outputs the image data to the preprocessing unit 220.

Also, the selector 221 in the preprocessing unit 220 sends the one image data (Bayer data) input from the input DMA unit 270 to the processing unit 222a. The respective processing units 222a to 222c sequentially perform preprocessing (a correction process) on the one image data (Bayer data).

The preprocessing unit 220 outputs the one image data subjected to the preprocessing (correction process) in the processing unit 222c to the AWB evaluation value generation unit 241 via the selector 240. Also, the AWB evaluation value generation unit 241 calculates (generates) the AWB evaluation value based on the one image data (Bayer data) input from the preprocessing unit 220 via the selector 240, and stores the generated AWB evaluation in the DRAM 501 via the DRAM controller 500.

In procedure 3, the CPU 600 selects, for example, a path C35 illustrated in FIG. 7B as the data path using the selector 221, the selector 230, the selector 240, the selector 250, and the selector 260.

Thus, even in another operation of the fourth evaluation value generation operation, the AWB evaluation value can be generated based on the image data that is in the state in which the image data of the respective fields is one image data, i.e., the state in which the pixel signals of the respective fields are combined. In another operation of the fourth evaluation value generation operation, for example, when there is preprocessing (correction process) in which there is little to no effect in a unit of image data of each field, i.e., there is preprocessing (correction process) in which an effect is possible to be obtained in a state in which one image data is prepared, it is useful in that such preprocessing (correction process) is possible to be effectively performed on the image data.

In addition, in the fourth evaluation value generation operation illustrated FIGS. 6A, 6B and 6C and another operation of the fourth evaluation value generation operation illustrated in FIGS. 7A and 7B, the case in which the respective processing units 222a to 222c sequentially perform the preprocessing (correction process) on the input image data has been described. However, the preprocessing (correction process) to which the image data is subjected is not limited to the preprocessing (correction process) being performed sequentially. For example, in each of the processing units 222a to 222c, switching as to whether to perform the preprocessing (correction process) on the input image data is performed. That is, each processing unit has a function of turning the preprocessing (correction process) ON or OFF. Further, in each procedure of the evaluation value generation operation, for example, the CPU 600 may switch whether each of the processing units 222a to 222c performs the preprocessing (correction process).

For example, a case in which the processing (correction process) of the processing unit 222b is preprocessing in which effective effects is possible to be obtained in a state in which one piece of image data is prepared (in other words, preprocessing in which effective effects are not possible to be obtained in units of the respective image data) is considered. In this case, in the fourth evaluation value generation operation, the CPU 600 selects the path C31 illustrated in FIG. 6A or the path C32 illustrated in FIG. 6B, and turns the preprocessing (correction process) of the processing units 222a and 222c ON and the preprocessing (correction process) of the processing unit 222b OFF in procedures 1 and 2. Also, in procedure 3, the CPU 600 selects the path C35 illustrated in FIG. 7B, and turns the preprocessing (correction process) of the processing units 222a and 222c OFF and the preprocessing (correction process) of the processing unit 222b ON. By controlling in this way, the preprocessing (correction process) can be performed on each piece of image data in a state in which effects of the preprocessing (correction process) of each of the processing units 222a to 222c is possible to be obtained effectively.

Further, even in another operation of the fourth evaluation value generation operation illustrated in FIGS. 7A and 7B, the case in which the image data of each field is first stored in the DRAM 501 in procedures 1 and 2, and then the AWB evaluation value generation unit 241 generates the AWB evaluation value in procedure 3 has been described.

However, even in another operation of the fourth evaluation value generation operation, the present invention is not limited to the case in which the AWB evaluation value generation unit 241 generates the AWB evaluation value, and the AE evaluation value generation unit 231, the AWB evaluation value generation unit 241 and the AF evaluation value generation unit 251 may generate the respective evaluation values in each of procedures 1, 2, and 3.

<Fifth Evaluation Value Generation Operation>

FIGS. 8A, 8B, 8C and 8D are diagrams schematically illustrating an example of a fifth evaluation value generation operation according to the imaging apparatus 10 of the present embodiment. In the fifth evaluation value generation operation, each of a plurality of pieces of image data according to pixel signals obtained while changing an exposure condition of the image sensor 100 is first stored in the DRAM 501, and then the image processing unit 300 performs image processing based on the respective image data stored in the DRAM 501 and stores resultant image data in the DRAM 501 again. The image processing unit 300 generates an evaluation value based on the image data after the image processing stored in the DRAM 501. In FIGS. 8A, 8B, 8C and 8D, a path of data in each process procedure of the fifth evaluation value generation operation is shown on the block diagram of the imaging apparatus 10 illustrated in FIG. 1.

In the following description, an example in which an evaluation value is generated based on two image data captured while changing the exposure time of the image sensor 100 will be described. For ease of description, exposure times for obtaining the respective image data are assumed to be a short exposure time (hereinafter referred to as "short exposure") and a long exposure time (hereinafter referred to as "long exposure"). Hereinafter, respective process procedures of the fifth evaluation value generation operation will be described in order. In the fifth evaluation value generation operation, generation of the respective evaluation values is performed in the following procedures.

(Procedure 1): First, the imaging apparatus 10 performs photography with short exposure, preprocesses image data of the short exposure according to a pixel signal of the short exposure output from the image sensor 100, generates the AE evaluation value and the AF evaluation value based on the preprocessed image data of short exposure after the preprocessing, and stores the preprocessed image data of short exposure after the preprocessing in the DRAM 501 as original image data of short exposure (Bayer data). More specifically, the pixel signal of the short exposure output from the image sensor 100 is input to the imaging processing unit 200, and the imaging IF unit 210 in the imaging processing unit 200 outputs the input pixel signal of the short exposure to the preprocessing unit 220 as image data of short exposure.

Also, the preprocessing unit 220 sequentially performs preprocessing (a correction process) on the image data of short exposure input from the imaging IF unit 210 using the respective processing units 222a to 222c. The preprocessing unit 220 outputs the preprocessed image data of short exposure after the preprocessing (correction process) in the processing unit 222c to the AE evaluation value generation unit 231 via the selector 230 and to the AF evaluation value generation unit 251 via the selector 250. In addition, the preprocessing unit 220 outputs the preprocessed image data of short exposure after the preprocessing (correction process) in the processing unit 222c to the output DMA unit 261 via the selector 260.

Also, the AE evaluation value generation unit 231 calculates (generates) the AE evaluation value based on the preprocessed image data of short exposure input from the preprocessing unit 220 via the selector 230. The AE evaluation value generation unit 231 stores the generated AE evaluation value in the DRAM 501 via the DRAM controller 500. Further, the AF evaluation value generation unit 251 calculates (generates) the AF evaluation value based on the preprocessed image data of short exposure input from the preprocessing unit 220 via the selector 250. The AF evaluation value generation unit 251 stores the generated AF evaluation value in the DRAM 501 via the DRAM controller 500. In addition, the output DMA unit 261 stores the preprocessed image data of short exposure (Bayer data) input from the preprocessing unit 220 via the selector 260 in the DRAM 501 via the DRAM controller 500.

Figure 8A:
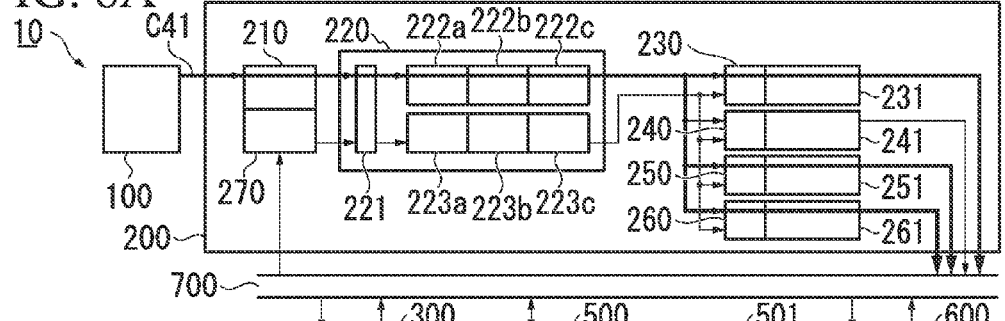
FIG. 8A is a diagram schematically illustrating an example of a fifth evaluation value generation operation according to the imaging apparatus of the present embodiment.

In procedure 1, the CPU 600 selects, for example, a path C41 illustrated in FIG. 8A as a data path using the selector 221, the selector 230, the selector 240, the selector 250, and the selector 260.

(Procedure 2): Subsequently, the imaging apparatus 10 performs photography with long exposure, preprocesses image data of long exposure according to a pixel signal of long exposure output from the image sensor 100, and stores the preprocessed image data of long exposure after preprocessing in the DRAM 501 as original image data of long exposure (Bayer data). More specifically, the pixel signal of long exposure output from the image sensor 100 is input to the imaging processing unit 200, and the imaging IF unit 210 in the imaging processing unit 200 outputs the input pixel signal of long exposure to the preprocessing unit 220 as the image data of long exposure.

Also, the preprocessing unit 220 sequentially performs preprocessing (correction process) on the image data of long exposure input from the imaging IF unit 210 using the respective processing units 222a to 222c, and outputs the preprocessed image data of the long exposure after the preprocessing (correction process) in the processing unit 222c to the output DMA unit 261 via the selector 260. The output DMA unit 261 stores the preprocessed image data of long exposure (Bayer data) input from the preprocessing unit 220 via the selector 260, in the DRAM 501 via the DRAM controller 500.

Figure 8B:
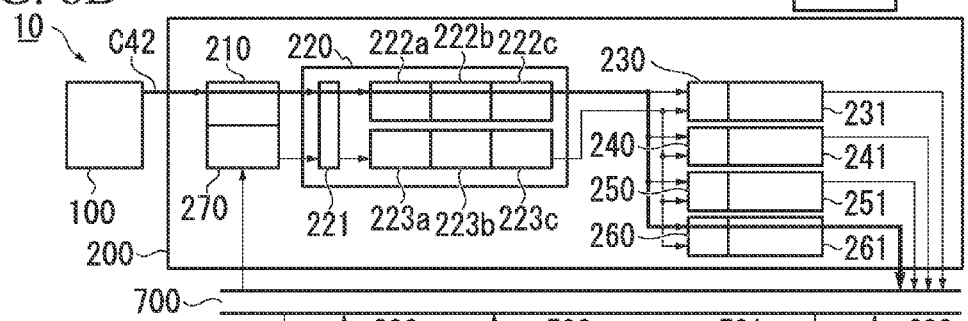
FIG. 8B is a diagram schematically illustrating an example of the fifth evaluation value generation operation according to the imaging apparatus of the present embodiment.

In procedure 2, the CPU 600 selects, for example, a path C42 illustrated in FIG. 8B as the data path using the selector 221, the selector 230, the selector 240, the selector 250, and the selector 260.

(Procedure 3) Subsequently, the imaging apparatus 10 performs image processing on the preprocessed image data of the short exposure (Bayer data) and the preprocessed image data of long exposure (Bayer data) stored in the DRAM 501, and stores image data after the image processing in the DRAM 501 again. More specifically, the image processing unit 300, which acquires (reads) the preprocessed image data of short exposure (Bayer data) and the preprocessed image data of long exposure (Bayer data) stored in the DRAM 501 via the DRAM controller 500, performs image processing to perform an image synthesis process on the acquired preprocessed image data of short exposure and the acquired preprocessed image data of long exposure and generate one preprocessed image data (Bayer data). It is possible to generate image data having a wide dynamic range of each pixel signal output from the image sensor 100 by performing the image synthesis process on the preprocessed image data of short exposure and the preprocessed image data of long exposure.

Also, the image processing unit 300 stores the one preprocessed image data after the image processing, in the DRAM 501 via the DRAM controller 500 again. In procedure 3, for example, the data is input or output to or from the image processing unit 300 along a path C43 illustrated in FIG. 8C.

(Step 4): Subsequently, the imaging apparatus 10 generates the AE evaluation value and the AWB evaluation value based on the one preprocessed image data after the image processing stored in the DRAM 501 using the AE evaluation value generation unit 231 and the AWB evaluation value generation unit 241. More specifically, the input DMA unit 270 in the imaging processing unit 200 acquires (reads) the one piece of preprocessed image data after the image processing, which is stored in the DRAM 501, via the DRAM controller 500. The input DMA unit 270 outputs the one acquired preprocessed image data after the image processing to the preprocessing unit 220. Also, the selector 221 in the preprocessing unit 220 sends the one preprocessed image data after the image processing input from the input DMA unit 270 to the delay unit 223a. Each of the delay units 223a to 223c delays the one input preprocessed image data after the image processing by a predetermined time.

The preprocessing unit 220 outputs the delayed image data from the delay unit 223c to the AE evaluation value generation unit 231 via the selector 230 and to the AWB evaluation value generation unit 241 via the selector 240. Also, the AE evaluation value generation unit 231 calculates (generates) the AE evaluation value based on the delayed image data input from the preprocessing unit 220 via the selector 230, i.e., the one preprocessed image data (Bayer data) after the image processing. The AE evaluation value generation unit 231 stores the generated AE evaluation value in the DRAM 501 via the DRAM controller 500. Further, the AWB evaluation value generation unit 241 calculates (generates) the AWB evaluation value based on the delayed image data input from the preprocessing unit 220 via the selector 240, i.e., the one preprocessed image data (Bayer data) after the image processing. The AWB evaluation value generation unit 241 stores the generated AWB evaluation value in the DRAM 501 via the DRAM controller 500.

Figure 8C:
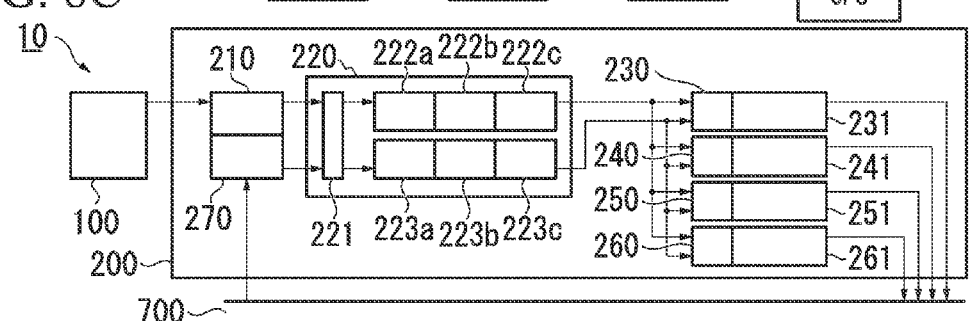
FIG. 8C is a diagram schematically illustrating an example of the fifth evaluation value generation operation according to the imaging apparatus of the present embodiment.
Figure 8D:
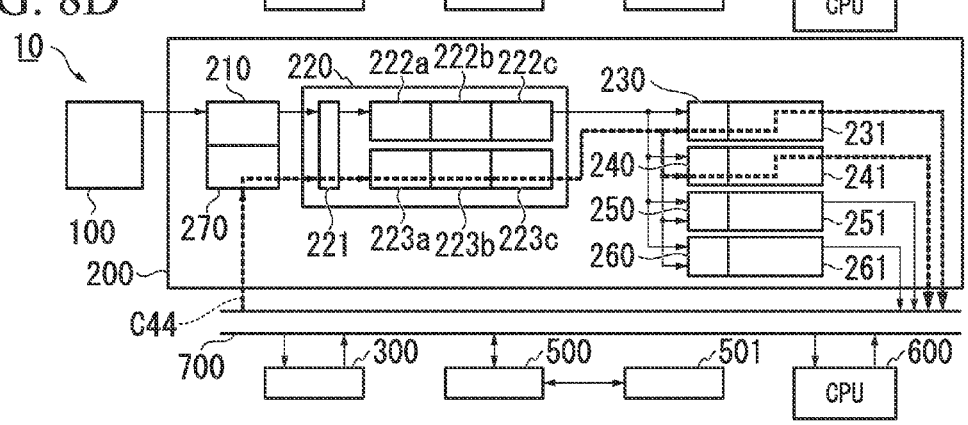
FIG. 8D is a diagram schematically illustrating an example of the fifth evaluation value generation operation according to the imaging apparatus of the present embodiment.

In procedure 4, the CPU 600 selects, for example, a path C44 illustrated in FIG. 8D as the data path using the selector 221, the selector 230, the selector 240, the selector 250, and the selector 260.

Thus, in the fifth evaluation value generation operation, the CPU 600 selects the paths for processing the image data as illustrated in FIGS. 8A, 8B, 8C and 8D in the respective process procedures using the selector 221, the selector 230, the selector 240, the selector 250, and the selector 260. Accordingly, the imaging apparatus 10 of the present embodiment stores the image data according to the pixel signals of the respective exposure conditions from the image sensor 100 in the DRAM 501. The image processing unit 300 performs image processing on the image data for the respective exposure conditions to generate image data after the image processing. Accordingly, the AE evaluation value generation unit 231 and the AWB evaluation value generation unit 241 are possible to generate the AE evaluation value and the AWB evaluation value based on the image data stored in the DRAM 501 (in the example of the fifth evaluation value generation operation, one preprocessed image data having a wide dynamic range obtained by performing the image synthesis process on the preprocessed image data of short exposure and the preprocessed image data of long exposure).

In the fifth evaluation value generation operation illustrated in FIGS. 8A, 8B, 8C and 8D, the case in which the AWB evaluation value generation unit 241 does not generate the AWB evaluation value in procedure 1 has been described. However, in procedure 1, the AWB evaluation value generation unit 241 may generate the AWB evaluation value.

Also, the case in which the AE evaluation value generation unit 231, the AWB evaluation value generation unit 241, and the AF evaluation value generation unit 251 do not generate the evaluation values in procedure 2 has been described. However, in procedure 2, the AE evaluation value generation unit 231, the AWB evaluation value generation unit 241, and the AF evaluation value generation unit 251 may generate the respective evaluation values.

Further, the case in which the AF evaluation value generation unit 251 does not generate the AF evaluation value in procedure 4 has been described. However, in procedure 4, the AF evaluation value generation unit 251 may generate the AF evaluation value based on the one piece of preprocessed image data (Bayer data) after the image processing input from the preprocessing unit 220.

In the fifth evaluation value generation operation illustrated in FIGS. 8A, 8B, 8C and 8D, the example in which, after the image data of the respective exposure times is stored in the DRAM 501 in procedures 1 and 2, the processing unit 300 performs the image processing in procedure 3 and the AE evaluation value generation unit 231 and the AWB evaluation value generation unit 241 generate the AE evaluation value and the AWB evaluation value in procedure 4 has been described. However, in the actual operation of the fifth evaluation value generation operation, procedures 3 and 4 are performed simultaneously with the process of any one or both of procedure 1 and procedure 2 of the fifth evaluation value generation operation illustrated in FIGS. 8A, 8B, 8C and 8D while alternately performing short exposure and long exposure of the image sensor 100, i.e., while alternately performing procedures 1 and 2. Accordingly, it is possible to generate the evaluation values, for example, while more smoothly displaying a real-time image output from the image sensor 100 on the display device 401.

<Actual Operation in Fifth Evaluation Value Generation Operation>

Figure 9A:
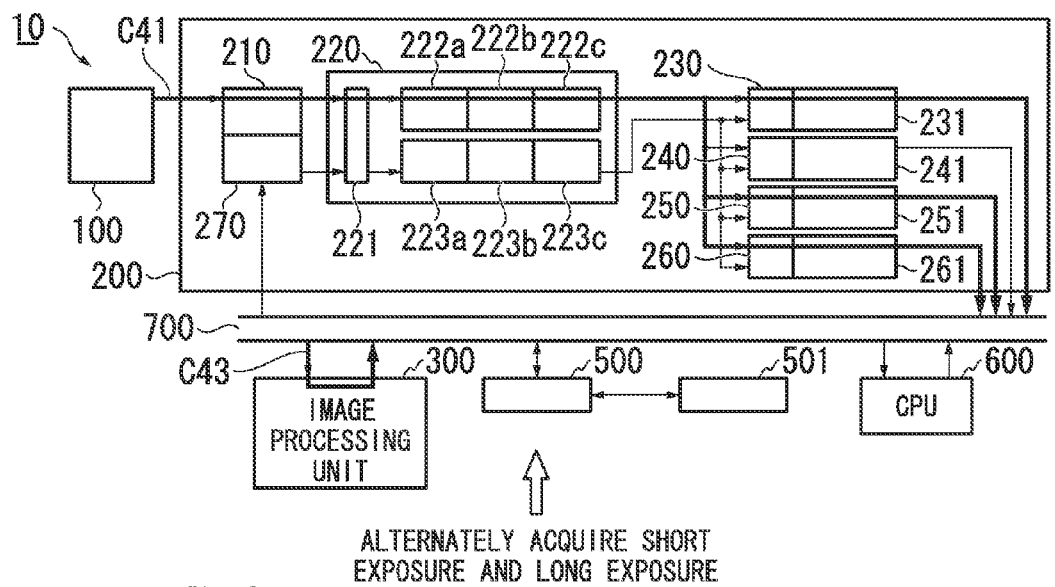
FIG. 9A is a diagram schematically illustrating an example of an actual operation in the fifth evaluation value generation operation according to the imaging apparatus of the present embodiment.
Figure 9B:
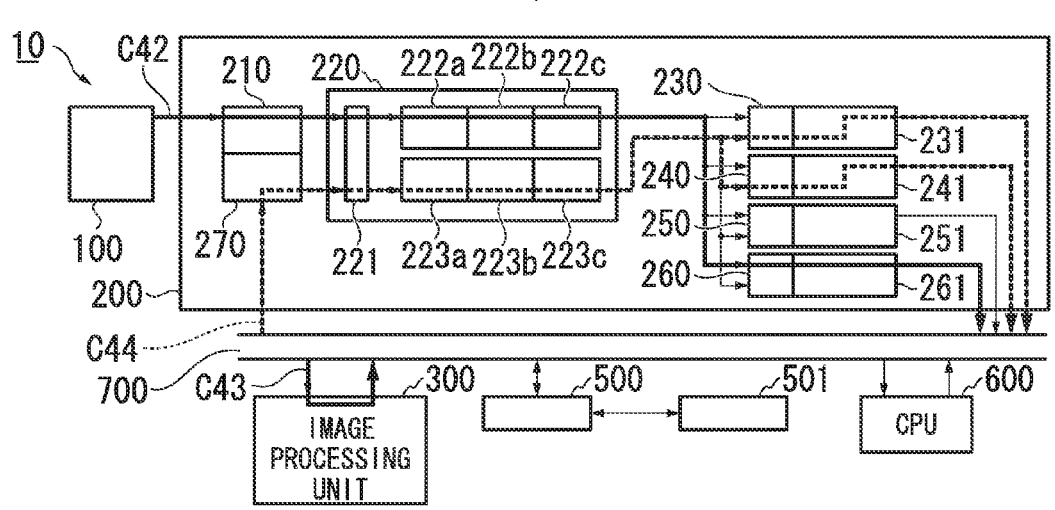
FIG. 9B is a diagram schematically illustrating an example of an actual operation in the fifth evaluation value generation operation according to the imaging apparatus of the present embodiment.

FIGS. 9A and 9B are diagrams schematically illustrating an example of actual operation in the fifth evaluation value generation operation according to the imaging apparatus 10 of the present embodiment. In FIGS. 9A and 9B, the paths of the data in the process of procedures 1 to 4 of the fifth evaluation value generation operation shown in FIGS. 8A, 8B, 8C and 8D, which are simultaneously performed in the actual operation of the fifth operation, are shown to correspond to the fifth evaluation value generation operation illustrated in FIGS. 8A, 8B, 8C and 8D.

Even in the actual operation of the fifth evaluation value generation operation illustrated in FIGS. 9A and 9B, the storage of the image of the short exposure in the DRAM 501 (procedure 1), the storage of the image data of long exposure in the DRAM 501 (Procedure 2), the storage of the one preprocessed image data after the image processing in the DRAM 501 (procedure 3), and the generation of the evaluation value based on the one preprocessed image data stored in the DRAM 501 (procedure 4) are performed, as in the fifth evaluation value generation operation illustrated in FIGS. 8A, 8B, 8C and 8D. In the actual operation of the fifth evaluation value generation operation illustrated in FIGS. 9A and 9B, the storage of the image data of the long exposure in the DRAM 501 (procedure 2) and the generation of the evaluation value based on the one preprocessed image data stored in the DRAM 501 (procedure 4) are performed at the same time.

More specifically, when the imaging IF unit 210 acquires the image data of short exposure from the image sensor 100, the imaging processing unit 200 performs the calculation (generation) of the AE evaluation value and the AF evaluation value based on the preprocessed image data of short exposure using the AE evaluation value generation unit 231 and the AF evaluation value generation unit 251, and the storage of the preprocessed image data of the short exposure (Bayer data) in the DRAM 501 using the output DMA unit 261 through procedure 1 (see the path C41 of FIG. 9A).

Then, when the imaging IF unit 210 acquires the image data of long exposure from the image sensor 100, the imaging processing unit 200 performs the storage of the preprocessed image data of long exposure (Bayer data) in the DRAM 501 using the output DMA unit 261 through procedure 2 (see the path C42 of FIG. 9B). Further, simultaneously, in the imaging processing unit 200, the input DMA unit 270 acquires (reads) the one preprocessed image data after the image processing stored in the DRAM 501 through procedure 4. In the imaging processing unit 200, the AE evaluation value generation unit 231 and the AWB evaluation value generation unit 241 perform calculation (generation) of the AE evaluation value and the AWB evaluation value based on the delayed image data obtained using the respective delay units 223a to 223c delaying the one acquired preprocessed image data after the image processing (see the path C44 of FIG. 9B).

Thereafter, the imaging processing unit 200 repeats the calculation (generation) of the AE evaluation value and the AF evaluation value based on the preprocessed image data of short exposure and the storage of the preprocessed image data of short exposure (Bayer data) in the DRAM 501 in procedure 1, the storage of the preprocessed image data of long exposure (Bayer data) in the DRAM 501 in procedure 2, and the calculation (generation) of the AE evaluation value and the AWB evaluation value based on the one piece of preprocessed image data after the image processing (the delayed image data) in procedure 4.

Further, simultaneously, the image processing unit 300 repeats image processing to generate one piece of preprocessed image data (Bayer data) by performing the image synthesis process on the preprocessed image data of short exposure and the preprocessed image data of long exposure in procedure 3. In the actual operation of the fifth evaluation value generation operation illustrated in FIGS. 9A and 9B, the image processing (Procedure 3) in the image processing unit 300 can be performed at any timing as long as image data for the image processing (in one example of the actual operation of the fifth operation, the preprocessed image data of short exposure and the preprocessed image data of long exposure) is prepared. That is, the image processing (Procedure 3) in the image processing unit 300 is possible to be performed simultaneously with one or both of the storage of the image data of short exposure in the DRAM 501 (Procedure 1) and the storage of the image data of long exposure in the DRAM 501 (Procedure 2). Accordingly, a path of data when procedure 3 is performed simultaneously with procedure 1 is illustrated in FIG. 9A, and a path of data when procedure 3 is performed simultaneously with procedure 2 is illustrated in FIG. 9B.

Thus, in the actual operation of the fifth evaluation value generation operation, the respective evaluation values are generated while alternately performing the process of short exposure illustrated in FIG. 9A and the process of long exposure illustrated in FIG. 9B. In addition, in the actual operation of the fifth evaluation value generation operation, in the process of long exposure, the preprocessed image data of long exposure (Bayer data) is stored in the DRAM 501 and simultaneously, the respective evaluation values are generated based on the one preprocessed image data after the image processing (the delayed image data). Accordingly, in the actual operation of the fifth evaluation value generation operation, it is possible to perform image processing for image synthesis of the preprocessed image data of short exposure and the preprocessed image data of long exposure, for example, during a period of a process of displaying the real-time image output from the image sensor 100 on the display device 401.

Even in the process of short exposure in the actual operation of the fifth evaluation value generation operation illustrated in FIG. 9A, the example in which the AWB evaluation value generation unit 241 does not generate the AWB evaluation value has been described, as in procedure 1 of the fifth evaluation value generation operation illustrated in FIGS. 8A, 8B, 8C and 8D. However, in the process of short exposure, the AWB evaluation value generation unit 241 may generate the AWB evaluation value.

Further, in the process of long exposure in the actual operation of the fifth evaluation value generation operation illustrated in FIG. 9B, the example in which the AF evaluation value generation unit 251 does not generate the AF evaluation value even when procedures 2 and 4 in the fifth evaluation value generation operation illustrated in FIGS. 8A, 8B, 8C and SD are simultaneously performed has been described. However, in the process of long exposure, the AF evaluation value generation unit 251 may generate the AF evaluation value.

As described above, in the embodiment of the present invention, the input DMA unit (in the present embodiment, the input DMA unit 270) that acquires (reads) the image data stored in the DRAM has been provided in the imaging processing unit of the imaging apparatus. Further, selectors that select the image data to be input to the corresponding evaluation value generation units (in the present embodiment, the selector 230, the selector 240, and the selector 250) have been provided in preceding stages (image data input units) of the evaluation value generation units included in the imaging processing unit (in the present embodiment, the AE evaluation value generation unit 231, the AWB evaluation value generation unit 241 and the AF evaluation value generation unit 251). Accordingly, the image data input to the evaluation value generation unit to generate the evaluation value is possible to be switched to either of the image data input in real time or the image data stored in the DRAM.

Thus, according to the embodiment of the present invention, it is possible to generate the respective evaluation values based on the image data input in real time, as in the conventional imaging apparatus, using the same evaluation value generation unit (diverting the same evaluation value generation unit), and it is possible to generate the evaluation value based on the image data according to the pixel signal that has already been acquired from the image sensor, i.e., image data other than the image data input in real time.

Further, according to the embodiment of the present invention, it is possible to generate the evaluation value based on the image data stored in the DRAM. Thus, it is possible to generate the evaluation value based on the image data according to the pixel signal output from the image sensor, as well as, for example, the image data after the image processing in the image processing unit included in the imaging apparatus.

Further, according to the embodiment of the present invention, it is possible to generate the evaluation value a plurality of times from the same image data stored in the DRAM. This is useful when different results of the evaluation values are desired to be obtained from the same image data. For example, it is possible to obtain the AF evaluation value of different filter characteristics using a first result of the AF evaluation value and a second result of the AF evaluation value by the AF evaluation value generation unit 251 performing calculation (generation) of the AF evaluation value on the same image data a plurality of times while changing parameters of filter characteristics. Accordingly, since it is unnecessary to include, in the imaging processing unit, the AF evaluation value generation unit capable of generating an AF evaluation value of a plurality of filter characteristics using a plurality of filters, it is possible to prevent an increase in a circuit scale of the imaging processing unit.

Further, according to the embodiment of the present invention, it is possible to simultaneously input the image data input in real time and the image data stored in the DRAM to different evaluation value generation units. Thus, it is possible to simultaneously perform the generation of the evaluation value based on the image data input in real time and the generation of the evaluation value based on the image data stored in the DRAM.

Accordingly, it is possible to reduce a processing time required for the evaluation value generation process in the imaging apparatus.

In addition, in the embodiment of the present invention, the delay units (the delay units 223a to 223c in the present embodiment) are provided in the preprocessing unit included in the imaging processing unit to delay the input image data by the same time as a delay time of the processing (correction process) in each processing unit that performs preprocessing (correction process) within the preprocessing unit and output the delayed image data. Accordingly, it is possible for a delay time from input of the image data to the preprocessing unit to output of the image data to be the same time in the respective processing units and the respective delay units. Thus, it is possible to facilitate control of the timing for an evaluation value generation process in the imaging apparatus. In addition, since the delay unit only delays and outputs the input image data, it is possible to prevent an increase in a circuit scale of the preprocessing unit.

Further, in the embodiment of the present invention, the selector that switches an output destination for the input image data (in the present embodiment, the selector 221) has been provided in the preprocessing unit included in the imaging processing unit. Accordingly, it is possible to store the image data input in real time in the DRAM without performing preprocessing on the image data input in real time and to perform preprocessing on the image data stored in the DRAM. Thus, it is possible to control a timing of performing preprocessing on the image data, and perform preprocessing on image data that is in a state in which effects can be further obtained.

More specifically, for example, first, the original image data (Bayer data) is stored in the DRAM without performing preprocessing (correction process) on the image data according to the pixel signal output from the image sensor. Then, preprocessed image data obtained by performing any preprocessing (correction process) on the original image data (Bayer data) stored in the DRAM can be stored in the DRAM. Thus, it is possible to perform the preprocessing (correction process) on the image data in a state in which effects of the preprocessing (correction process) in the imaging apparatus can be obtained more effectively, for example, by changing a preprocessing method according to a captured scene or performing the preprocessing again.

In the present embodiment, the case in which the three delay units 223a to 223c corresponding to the processing units 222a to 222c included in the preprocessing unit 220 are provided and the respective delay units 223a to 223c delay the input image data by the same time as the delay time from the input to the output of the corresponding processing units 222a to 222c and output delayed image data has been described. However, the configuration of the delay unit is not limited to the embodiment of the present invention. For example, only one delay unit that delays the input image data by the same time as a total delay time of preprocessing (a correction process) in the processing units 222a to 222c and outputs delayed image data may be provided, in place of the delay units 223a to 223c.

Further, in the present embodiment, the case in which the delay units 223a to 223c are provided in the preprocessing unit 220 has been described. However, the internal configuration of the preprocessing unit 220 is not limited to the embodiment of the present invention. For example, when the CPU 600 can control a timing at which the preprocessing of image data that the imaging IF unit 210 acquires in real time ends and a timing at which the input DMA unit 270 acquires (reads) the image data stored in the DRAM 501 to be the same timing, in consideration of a delay time (processing time) of the process in the preprocessing unit 220, the delay units 223*a* to 223*c* may not be provided in the preprocessing unit 220. In this case, the selector 221 outputs the input image data to each of the selector 230, the selector 240, the selector 250, and the selector 260, instead of sending the image data to the delay unit 223*a*. It is possible to shorten a time from the selector 221 outputting the image data to each evaluation value generation unit ending the generation of the evaluation value.

Further, in the present embodiment, the case in which the delay units 223*a* to 223*c* that delay the input image data by the same time as a delay time from the input to the output of each of the processing units 222*a* to 222*c* and output delayed image data are provided in the preprocessing unit 220 has been described. However, the internal configuration of the preprocessing unit 220 is not limited to the embodiment of the present invention. For example, another set of processing units 222*a* to 222*c* may be provided in place of the delay units 223*a* to 223*c*. In this case, it is possible to simultaneously perform preprocessing (correction process) on both the image data input in real time and the image data stored in the DRAM. In this case, the scale of circuit of the preprocessing unit increases. However, such a configuration is considered to be useful in an imaging apparatus in which the preprocessing (correction process) is required to be simultaneously performed on different image data, in spite of the increase in the circuit scale.

While the embodiments of the present invention have been described above with reference to the accompanying drawings, a concrete configuration is not limited to the embodiments and includes various changes without departing from the scope and spirit of the present invention. While the preferred embodiments of the present invention have been described above, the present invention is not limited to the embodiments. Additions, omissions, and substitutions, and other variations of the configuration may be made to the present invention without departing from the scope and spirit of the present invention. The present invention is not limited by the above-described description, but only by the appended claims.

What is claimed is:

1. An imaging apparatus comprising:
    an image data interface unit that outputs image data according to a pixel signal input from a solid-state imaging device as first image data;
    an image data reading unit that reads image data stored in a storage unit and outputs the read image data as second image data;
    an evaluation value generation unit that generates an evaluation value based on input image data;
    an image data selection unit that selects one of image data based on the first image data and image data based on the second image data as image data to be input to the evaluation value generation unit;
    an image data writing unit that stores the image data based on the first image data in the storage unit;
    a first preprocessing unit that performs a predetermined process on input image data; and
    a second preprocessing unit that performs a predetermined process on input image data,
    wherein the first preprocessing unit outputs, as third image data, image data obtained by performing a predetermined process on one of the first image data and the second image data to be input,
    the second preprocessing unit outputs, as fourth image data, image data obtained by performing a predetermined process on the other of the first image data and the second image data to be input,
    the image data selection unit selects one of the third image data and the fourth image data as the image data to be input to the evaluation value generation unit,
    the image data writing unit stores one of the third image data and the fourth image data based on the first image data in the storage unit,
    the first preprocessing unit is at least one processing unit that performs a predetermined correction process on input image data,
    the second preprocessing unit is at least one delay unit that performs a process of delaying input image data by a predetermined time and outputting delayed image data,
    the predetermined time is the same time as a delay time from a time when the image data is input to the first preprocessing unit to a time when the image data is subjected to the predetermined correction process and output,
    when the evaluation value generation unit generates an evaluation value based on the image data according to the pixel signal input from the solid-state imaging device, the image data selection unit selects one of the third image data and the fourth image data based on the first image data as the image data to be input to the evaluation value generation unit, and
    when the evaluation value generation unit generates an evaluation value based on the image data stored in the storage unit, the image data selection unit selects one of the third image data and the fourth image data based on the second image data as the image data to be input to the evaluation value generation unit.

2. The imaging apparatus according to claim 1, further comprising
    an image processing unit that performs predetermined image processing on the image data stored in the storage unit and stores image data after the image processing in the storage unit again,
    wherein, when the evaluation value generation unit generates an evaluation value based on the image data after the image processing in the image processing unit,
    the image data reading unit reads the image data after the image processing in the image processing unit, which is stored in the storage unit, and outputs the read image data as the second image data, and
    the image data selection unit selects one of the third image data and the fourth image data based on the second image data as the image data to be input to the evaluation value generation unit.

3. The imaging apparatus according to claim 1, further comprising
    a motion detection unit that detects a motion of a subject contained in the image data based on the image data stored in the storage unit,
    wherein, when the evaluation value generation unit generates an evaluation value according to the motion of the subject detected by the motion detection unit,
    the image data reading unit reads the image data used when the motion detection unit detects the motion of the subject, which is stored in the storage unit, and outputs the read image data as the second image data, and the image data selection unit selects one of the third image data and the fourth image data based on the second image data as the image data to be input to the evaluation value generation unit.

4. The imaging apparatus according to claim 1, wherein:
when the solid-state imaging device divides an pixel signal of one image into a plurality of fields and outputs a resultant pixel signal and the evaluation value generation unit generates an evaluation value based on image data according to the pixel signal of one image input from the solid-state imaging device,
the image data interface unit outputs image data of respective fields according to respective pixel signals divided into the plurality of fields, which are input from the solid-state imaging device, as the first image data of the respective fields,
the image data writing unit sequentially stores, in the storage unit, one of the third image data and the fourth image data based on the first image data of the respective fields,
the image data reading unit reads the first image data of all the fields constituting one image and outputs the first image data as the second image data corresponding to the one image so that the first image data of the respective fields stored in the storage unit are combined as the one image, and
the image data selection unit selects one of the third image data and the fourth image data based on the second image data corresponding to the one image as the image data to be input to the evaluation value generating unit.

5. The imaging apparatus according to claim 1, further comprising:
an image processing unit that performs predetermined image processing on the image data stored in the storage unit and stores image data after the image processing in the storage unit again,
wherein, when the evaluation value generation unit generates an evaluation value based on the image data after the image processing unit performs the image processing on each image data according to each pixel signal obtained while changing an exposure condition of the solid-state imaging device,
the image data interface unit outputs image data of respective exposure conditions according to the pixel signal of the respective exposure conditions input from the solid-state imaging device as the first image data of the respective exposure conditions,
the image data writing unit sequentially stores, in the storage unit, one of the third image data and the fourth image data based on the first image data of the respective exposure conditions,
the image data reading unit reads one image data after the image processing unit performs image processing to synthesize the first image data of the respective exposure conditions, being stored in the storage unit, into one image, and outputs the read image data as the second image data, and
the image data selection unit selects one of the third image data and the fourth image data based on the one second image data as the image data to be input to the evaluation value generating unit.

6. The imaging apparatus according to claim 2, wherein:
the imaging apparatus includes:
a plurality of evaluation value generation units; and
a plurality of image data selection units corresponding to the plurality of evaluation value generation units, respectively, wherein each image data selection unit selects one of the third image data and the fourth image data based on one of the first image data and the second image data to be used when the corresponding evaluation value generation unit generates the evaluation value as image data to be input to the corresponding evaluation value generation unit.

7. The imaging apparatus according to claim 6, wherein:
at least one of the image data selection units selects one of the third image data and the fourth image data based on one of the first image data and the second image data to be used when the corresponding evaluation value generation unit generates the evaluation value as the image data to be input to the corresponding evaluation value generation unit; and
at least another of the image data selection units selects the other of the third image data and the fourth image data based on the other of the first image data and the second image data to be used when the corresponding evaluation value generation unit generates the evaluation value as the image data to be input to the corresponding evaluation value generation unit.

8. An evaluation value generation apparatus comprising:
an image data interface unit that outputs image data according to a pixel signal input from a solid-state imaging device as first image data;
an image data reading unit that reads image data stored in a storage unit and outputs the read image data as second image data;
an evaluation value generation unit that generates an evaluation value based on input image data;
an image data selection unit that selects one of image data based on the first image data and image data based on the second image data as image data to be input to the evaluation value generation unit; and
an image data writing unit that stores the image data based on the first image data in the storage unit,.
a first preprocessing unit that performs a predetermined process on input image data and
a second preprocessing unit that performs a predetermined process on input image data,
wherein the first preprocessing unit outputs, as third image data, image data obtained by performing a predetermined process on one of the first image data and the second image data to be input,
the second preprocessing unit outputs, as fourth image data, image data obtained by performing a predetermined process on the other of the first image data and the second image data to be input,
the image data selection unit selects one of the third image data and the fourth image data as the image data to be input to the evaluation value generation unit,
the image data writing unit stores one of the third image data and the fourth image data based on the first image data in the storage unit,
the first preprocessing unit is at least one first processing unit that performs a predetermined correction process on the input image data
the second preprocessing unit is at least one second processing unit that performs a predetermined correction process on the input image data,
when the evaluation value generation unit generates an evaluation value based on the image data according to the pixel signal input from the solid-state imaging device, the image data selection unit selects one of the third image data and the fourth image data based on the first image data as the image data to be input to the evaluation value generation unit, and when the evaluation value generation unit generates an evaluation value based on the image data stored in the storage unit, the image data selection unit selects one of the third image data and the fourth image data based on the second image data as the image data to be input to the evaluation value generation unit.

9. An imaging apparatus comprising:

an image data interface unit that outputs image data according to a pixel signal input from a solid-state imaging device as first image data;

an image data reading unit that reads image data stored in a storage unit and outputs the read image data as second image data;

an evaluation value generation unit that generates an evaluation value based on input image data;

an image data selection unit that selects one of image data based on the first image data and image data based on the second image data as image data to be input to the evaluation value generation unit;

an image data writing unit that stores the image data based on the first image data in the storage unit;

a first preprocessing unit that performs a predetermined process on input image data; and a second preprocessing unit that performs a predetermined process on input image data, wherein the first preprocessing unit outputs, as third image data, image data obtained by performing a predetermined process on one of the first image data and the second image data to be input, the second preprocessing unit outputs, as fourth image data, image data obtained by performing a predetermined process on the other of the first image data and the second image data to be input, the image data selection unit selects one of the third image data and the fourth image data as the image data to be input to the evaluation value generation unit, the image data writing unit stores one of the third image data and the fourth image data based on the first image data in the storage unit, the first preprocessing unit is at least one first processing unit that performs a predetermined correction process on the input image data;

the second preprocessing unit is at least one second processing unit that performs a predetermined correction process on the input image data, when the evaluation value generation unit generates an evaluation value based on the image data according to the pixel signal input from the solid-state imaging device, the image data selection unit selects one of the third image data and the fourth image data based on the first image data as the image data to be input to the evaluation value generation unit, and when the evaluation value generation unit generates an evaluation value based on the image data stored in the storage unit, the image data selection unit selects one of the third image data and the fourth image data based on the second image data as the image data to be input to the evaluation value generation unit.

10. An imaging method, comprising:

outputting image data according to a pixel signal input from a solid-state imaging device as first image data;

reading image data stored in a storage unit and outputting the read image data as second image data;

generating an evaluation value using an evaluation value generation unit based on input image data;

selecting one of image data using an image data selection unit based on the first image data and image data based on the second image data as image data to be input to the evaluation value generation unit;

storing the image data based on the first image data in the storage unit;

outputting, as third image data, image data obtained by performing a predetermined process, using a first preprocessing unit, on one of the first image data and the second image data to be input, outputting, as fourth image data, image data obtained by performing a predetermined process, using a second preprocessing unit, on the other of the first image data and the second image data to be input, selecting one of the third image data and the fourth image data as the image data to be input to the evaluation value generation unit, storing one of the third image data and the fourth image data based on the first image data in the storage unit, selecting one of the third image data and the fourth image data based on the first image data as the image data to be input to the evaluation value generation unit, when the evaluation value generation unit generates an evaluation value based on the image data according to the pixel signal input from the solid-state imaging device, and selecting one of the third image data and the fourth image data based on the second image data as the image data to be input to the evaluation value generation unit, when the evaluation value generation unit generates an evaluation value based on the image data stored in the storage unit, the image data selection unit selects, wherein the first preprocessing unit is at least one first processing unit that performs a predetermined correction process on the input image data; and the second preprocessing unit is at least one second processing unit that performs a predetermined correction process on the input image data.

11. The imaging method according to claim 10, further comprising:

performing predetermined image processing on the image data stored in the storage unit and storing image data after the image processing in the storage unit again, wherein, when the evaluation value generation unit generates an evaluation value based on the image data after the image processing in the image processing unit, reading the image data after the image processing in the image processing unit, which is stored in the storage unit, and outputting the read image data as the second image data, and selecting one of the third image data and the fourth image data based on the second image data as the image data to be input to the evaluation value generation unit.

12. The imaging method according to claim 10, further comprising:

detecting a motion of a subject contained in the image data based on the image data stored in the storage unit, wherein, when the evaluation value generation unit generates an evaluation value according to the detected motion of the subject, reading the image data used when the motion of the subject is detected, which is stored in the storage unit, and outputting the read image data as the second image data, and selecting one of the third image data and the fourth image data based on the second image data as the image data to be input to the evaluation value generation unit.

13. The imaging method according to claim 10, further comprising:
- wherein when the solid-state imaging device divides an pixel signal of one image into a plurality of fields and outputs a resultant pixel signal and the evaluation value generation unit generates an evaluation value based on image data according to the pixel signal of one image input from the solid-state imaging device,
- outputting image data of respective fields according to respective pixel signals divided into the plurality of fields, which are input from the solid-state imaging device, as the first image data of the respective fields,
- sequentially storing, in the storage unit, one of the third image data and the fourth image data based on the first image data of the respective fields,
- reading the first image data of all the fields constituting one image and outputs the first image data as the second image data corresponding to the one image so that the first image data of the respective fields stored in the storage unit are combined as the one image, and
- selecting one of the third image data and the fourth image data based on the second image data corresponding to the one image as the image data to be input to the evaluation value generating unit.

14. The imaging method according to claim 10, further comprising:
- performing predetermined image processing on the image data stored in the storage unit and storing image data after the image processing in the storage unit again,
- wherein, when the evaluation value generation unit generates an evaluation value based on the image data after the image processing unit performs the image processing on each image data according to each pixel signal obtained while changing an exposure condition of the solid-state imaging device,
- outputting image data of respective exposure conditions according to the pixel signal of the respective exposure conditions input from the solid-state imaging device as the first image data of the respective exposure conditions,
- sequentially stores, in the storage unit, one of the third image data and the fourth image data based on the first image data of the respective exposure conditions,
- reading one image data after the image processing unit performs image processing to synthesize the first image data of the respective exposure conditions, being stored in the storage unit, into one image, and outputs the read image data as the second image data, and
- selecting one of the third image data and the fourth image data based on the one second image data as the image data to be input to the evaluation value generating unit.

15. The imaging method according to claim 11, including a plurality of evaluation value generation units; and a plurality of image data selection units corresponding to the plurality of evaluation value generation units, respectively, said imaging method comprising:
- selecting one of the third image data and the fourth image data, by each image data selection unit, based on one of the first image data and the second image data to be used when the corresponding evaluation value generation unit generates the evaluation value as image data to be input to the corresponding evaluation value generation unit.

16. The imaging method according to claim 15, wherein:
- selecting one of the third image data and the fourth image data, by at least one of the image data selection units, based on one of the first image data and the second image data to be used when the corresponding evaluation value generation unit generates the evaluation value as the image data to be input to the corresponding evaluation value generation unit; and
- selecting the other of the third image data and the fourth image data, by at least another of the image data selection units, based on the other of the first image data and the second image data to be used when the corresponding evaluation value generation unit generates the evaluation value as the image data to be input to the corresponding evaluation value generation unit.

* * * * *